United States Patent
Li et al.

(10) Patent No.: US 10,097,524 B2
(45) Date of Patent: Oct. 9, 2018

(54) NETWORK CONFIGURATION METHOD, AND RELATED APPARATUS AND SYSTEM

(71) Applicant: Huawei Device (Dongguan) Co., Ltd., Dongguan (CN)

(72) Inventors: Xiaoxian Li, Shenzhen (CN); Zhiming Ding, Shenzhen (CN); Gaokun Pang, Shenzhen (CN); Su Lu, Shenzhen (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 97 days.

(21) Appl. No.: 15/106,871

(22) PCT Filed: Dec. 31, 2013

(86) PCT No.: PCT/CN2013/091236
§ 371 (c)(1),
(2) Date: Jun. 21, 2016

(87) PCT Pub. No.: WO2015/100675
PCT Pub. Date: Jul. 9, 2015

(65) Prior Publication Data
US 2017/0006004 A1    Jan. 5, 2017

(51) Int. Cl.
*H04L 29/00* (2006.01)
*H04L 29/06* (2006.01)
(Continued)

(52) U.S. Cl.
CPC ............ *H04L 63/061* (2013.01); *G06F 21/42* (2013.01); *H04L 41/0806* (2013.01);
(Continued)

(58) Field of Classification Search
CPC .......... H04L 63/0428; H04L 2463/062; H04L 67/34; H04W 4/008; G06F 21/42
See application file for complete search history.

(56) References Cited

U.S. PATENT DOCUMENTS

| | | |
|---|---|---|
| 2002/0169953 A1 | 11/2002 | Moharram et al. |
| 2003/0233550 A1 | 12/2003 | Brickell |

(Continued)

FOREIGN PATENT DOCUMENTS

| | | |
|---|---|---|
| CN | 1661959 A | 8/2005 |
| CN | 101083530 A | 12/2007 |

(Continued)

OTHER PUBLICATIONS

Partial English Translation and Abstract of Chinese Patent Application No. CN101150849, Jun. 24, 2016, 5 pages.
(Continued)

*Primary Examiner* — Madhuri R Herzog
(74) *Attorney, Agent, or Firm* — Conley Rose, P.C.

(57) ABSTRACT

A network configuration method, including acquiring a public key operation value of a second device in an out-of-band manner, acquiring a public key copy of the second device that is sent by the second device and that is used to perform key exchange, performing an operation of the preset algorithm on the public key copy of the second device, to obtain a public key operation value copy of the second device, and generating a first exchange key according to a private key that is used by the first device to perform key exchange and the acquired public key copy of the second device after the public key operation value copy of the second device matches the public key operation value of the second device, and hence the method simplifies a network configuration process.

15 Claims, 14 Drawing Sheets

(51) Int. Cl.
*H04L 12/24* (2006.01)
*G06F 21/42* (2013.01)
*H04W 4/80* (2018.01)
*H04L 29/08* (2006.01)
*H04L 9/08* (2006.01)
*H04W 4/00* (2018.01)
*H04W 12/02* (2009.01)
*H04W 84/12* (2009.01)

(52) U.S. Cl.
CPC ...... *H04L 63/0428* (2013.01); *H04L 63/0435* (2013.01); *H04L 63/06* (2013.01); *H04L 63/12* (2013.01); *H04L 9/0816* (2013.01); *H04L 63/0823* (2013.01); *H04L 67/34* (2013.01); *H04L 2463/062* (2013.01); *H04W 4/008* (2013.01); *H04W 4/80* (2018.02); *H04W 12/02* (2013.01); *H04W 84/12* (2013.01)

(56) References Cited

U.S. PATENT DOCUMENTS

| | | | |
|---|---|---|---|
| 2005/0193203 A1 | 9/2005 | Freeman et al. | |
| 2007/0104322 A1 | 5/2007 | Ding et al. | |
| 2009/0318114 A1* | 12/2009 | Bertoni | H04L 9/0841 455/410 |
| 2010/0333186 A1* | 12/2010 | Chan | H04L 9/3236 726/10 |
| 2012/0216286 A1* | 8/2012 | Johnson | G06F 21/64 726/26 |
| 2012/0331538 A1 | 12/2012 | Yuan et al. | |
| 2013/0036231 A1 | 2/2013 | Suumaki | |
| 2015/0271667 A1* | 9/2015 | Bernsen | H04L 63/06 713/171 |

FOREIGN PATENT DOCUMENTS

| | | |
|---|---|---|
| CN | 101150849 A | 3/2008 |
| CN | 101667913 A | 3/2010 |
| CN | 102195930 A | 9/2011 |
| EP | 1569382 A1 | 8/2005 |

OTHER PUBLICATIONS

Foreign Communication From a Counterpart Application, European Application No. 13900670.4, Extended European Search Report dated Nov. 10, 2016, 9 pages.

Foreign Communication From a Counterpart Application, PCT Application No. PCT/CN2013/091236, English Translation of International Search Report dated Sep. 26, 2014, 2 pages.

Foreign Communication From a Counterpart Application, PCT Application No. PCT/CN2013/091236, English Translation of Written Opinion dated Sep. 26, 2014, 17 pages.

Machine Translation and Abstract of Chinese Publication No. CN101083530, Dec. 5, 2007, 9 pages.

Machine Translation and Abstract of Chinese Publication No. CN101667913, Mar. 10, 2010, 10 pages.

Foreign Communication From a Counterpart Application, Chinese Application No. 201380081351.3, Chinese Office Action dated May 3, 2018, 9 pages.

* cited by examiner

NETWORK CONFIGURATION METHOD, AND RELATED APPARATUS AND SYSTEM

CROSS-REFERENCE TO RELATED APPLICATION

This application is a U.S. National Stage of International Application No. PCT/CN2013/091236, filed on Dec. 31, 2013, which is hereby incorporated by reference in its entirety.

TECHNICAL FIELD

The present disclosure relates to the communications field, and in particular, to a network configuration method, and a related apparatus, and system.

BACKGROUND

WI-FI, as a widely applied wireless communications technology, has advantages of fast deployment, being convenient to use, and a high transmission rate, and is widely applied to various industries. Access points of WI-FI networks are deployed across places such as hotels, cafes, schools, and hospitals, and it can be said that WI-FI is everywhere in life.

Although WI-FI networks are increasingly popular, WI-FI network setup is complex, and therefore, equipment vendors still need to invest a large quantity of support costs to help users establish WI-FI networks and resolve problems during using the WI-FI networks. Among users who have successfully set up wireless networks, 60% to 70% of the users still do not configure any security parameter, and the networks are easily attacked. To resolve confusion of users when they use wireless networks, the WI-FI ALLIANCE has put forward WI-FI PROTECTED SETUP (WPS) specifications, also referred to as WI-FI simple configuration (WSC), which intends to simplify operations when a user sets up a wireless local area network (WLAN) such that users who know little about wireless settings and security can also set up secure WLANs easily and conveniently, and can add devices to the networks conveniently.

Main application scenarios of the WPS are: 1. initial WLAN setup, which refers to establishing a WLAN for a new access point (AP) using a configuration device, 2. adding a new device to a WLAN after the WLAN is established.

The WPS standard provides three configuration manners, a personal identification number (PIN) manner, a push button control (PBC) manner, and a near field communication (NFC) manner. The PIN manner refers to that a user enters, on a register, a PIN code of a device to be configured. The PBC manner refers to that a user presses push buttons almost at the same time on a register and a device to be configured. The NFC manner includes three means: 1. directly transmitting configuration information by means of NFC, 2. transmitting, to a configuration device by means of NFC, a password of a device to be configured, and 3. performing connection handover by means of NFC, and exchanging, by two parties, Diffie-Hellman (DH) public key hash values.

However, in the PIN manner, a PIN code needs to be entered manually, which is relatively complex and not secure. In the PBC manner, although an operation is easy, the PBC manner cannot resist active attacks. The NFC manner requires that all devices have NFC interfaces, which is of relatively low universality. In addition, in the WPS, verification is performed using eight messages M1 to M8. The messages are of a wide variety and complex, a requirement on a processing capability of a terminal is relatively high, and configuration efficiency is low. Moreover, bandwidths of out-of-band channels (that is, other channels except a WI-FI channel) of both devices that need to be configured are limited, and during a configuration process, interaction messages are of a wide variety and complex, or an interaction message has excessively large content, which also leads to low configuration efficiency.

SUMMARY

To resolve a technical problem, embodiments of the present disclosure provide a network configuration method, related apparatus, and system, to simplify a network configuration process, improve configuration security, and significantly improve configuration experience of users.

According to a first aspect, an embodiment of the present disclosure provides a network configuration method, including acquiring a public key operation value of a second device in an out-of-band manner, where the public key operation value of the second device is a result obtained by performing an operation of a preset algorithm on a public key that is used by the second device to perform key exchange, generating public key information of a first device according to a public key that is used by the first device to perform key exchange, and sending the public key information of the first device to the second device such that the second device acquires the public key of the first device according to the public key information of the first device, acquiring a public key copy of the second device that is sent by the second device and that is used to perform key exchange, and performing an operation of the preset algorithm on the public key copy of the second device, to obtain a public key operation value copy of the second device, and after the public key operation value copy of the second device matches the public key operation value of the second device, generating a first exchange key according to a private key that is used by the first device to perform key exchange and the acquired public key copy of the second device in order to process configuration information between the first device and the second device using the first exchange key.

With reference to the first aspect, in a first possible implementation manner, before generating public key information of a first device according to a public key that is used by the first device to perform key exchange, the method further includes acquiring key information of the second device in the out-of-band manner.

With reference to the first possible implementation manner of the first aspect, in a second possible implementation manner, generating public key information of a first device according to a public key that is used by the first device to perform key exchange includes performing, using the key information of the second device as a symmetric encryption key, a symmetric encryption operation on the public key that is used by the first device to perform key exchange, to generate the public key information of the first device.

With reference to the first aspect, or the first possible implementation manner of the first aspect, in a third possible implementation manner, generating public key information of a first device according to a public key that is used by the first device to perform key exchange includes performing, using the public key operation value of the second device as a symmetric encryption key, a symmetric encryption operation on the public key that is used by the first device to perform key exchange, to generate the public key information of the first device.

With reference to the third possible implementation manner of the first aspect, in a fourth possible implementation manner, acquiring a public key copy of the second device that is sent by the second device and that is used to perform key exchange includes receiving public key information of the second device sent by the second device, where the public key information of the second device is information obtained by performing, by the second device, a symmetric encryption operation on the public key of the second device using a public key operation value of the first device as a symmetric encryption key, decrypting the public key information of the second device using a first device public key operation value copy of the first device, to obtain the public key copy of the second device, where the public key operation value of the first device is a result obtained by performing, by the second device, an operation of the preset algorithm on the obtained public key of the first device, and the public key operation value copy of the first device is a result obtained by performing an operation of the preset algorithm on the public key of the first device, or receiving public key information of the second device sent by the second device, where when the first device acquires the key information of the second device in the out-of-band manner, the public key information of the second device is information obtained by performing, by the second device, a symmetric encryption operation on the public key of the second device using the key information of the second device as a symmetric encryption key, and decrypting the public key information of the second device using the key information of the second device acquired by the first device, to obtain the public key copy of the second device.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner, generating a first exchange key according to a private key that is used by the first device to perform key exchange and the acquired public key copy of the second device in order to process configuration information between the first device and the second device using the first exchange key includes performing an operation on the public key copy of the second device and the private key that is used by the first device to perform key exchange, to obtain the first exchange key, and encrypting the configuration information using the first exchange key as an encryption key, and sending encrypted configuration information to the second device.

With reference to the first aspect, the first possible implementation manner of the first aspect, the second possible implementation manner of the first aspect, the third possible implementation manner of the first aspect, or the fourth possible implementation manner of the first aspect, in a sixth possible implementation manner, generating a first exchange key according to a private key that is used by the first device to perform key exchange and the acquired public key copy of the second device in order to process configuration information between the first device and the second device using the first exchange key includes receiving configuration information sent by the second device, where the configuration information sent by the second device is configuration information that is encrypted using a second exchange key as an encryption key, and the second exchange key is a result obtained by performing, by the second device, an operation on the obtained public key of the first device and a private key of the second device, performing an operation on the public key copy of the second device and the private key that is used by the first device to perform key exchange, to obtain the first exchange key, and decrypting the received configuration information using the first exchange key.

With reference to the first aspect, the first possible implementation manner of the first aspect, the second possible implementation manner of the first aspect, the third possible implementation manner of the first aspect, or the fourth possible implementation manner of the first aspect, in a seventh possible implementation manner, generating a first exchange key according to a private key that is used by the first device to perform key exchange and the acquired public key copy of the second device in order to process configuration information between the first device and the second device using the first exchange key includes performing an operation on the public key copy of the second device and the private key that is used by the first device to perform key exchange, to obtain the first exchange key, and encrypting a public key operation value of a third device using the first exchange key as an encryption key, where the public key operation value of the third device is a result obtained by performing an operation of the preset algorithm on a public key that is used by the third device to perform key exchange, and sending an encrypted public key operation value of the third device to the second device such that the second device can acquire the public key operation value of the third device securely, and performs key exchange with the third device using the public key operation value of the third device and completes a final configuration process.

With reference to the first aspect, the first possible implementation manner of the first aspect, the second possible implementation manner of the first aspect, the third possible implementation manner of the first aspect, or the fourth possible implementation manner of the first aspect, in an eighth possible implementation manner, generating a first exchange key according to a private key that is used by the first device to perform key exchange and the acquired public key copy of the second device in order to process configuration information between the first device and the second device using the first exchange key includes performing an operation on the public key copy of the second device and the private key that is used by the first device to perform key exchange, to obtain the first exchange key, and generating, based on the first exchange key, a session key used to protect service data transmission between the first device and the second device.

With reference to the first aspect, the first possible implementation manner of the first aspect, the second possible implementation manner of the first aspect, the third possible implementation manner of the first aspect, or the fourth possible implementation manner of the first aspect, in a ninth possible implementation manner, generating a first exchange key according to a private key that is used by the first device to perform key exchange and the acquired public key copy of the second device in order to process configuration information between the first device and the second device using the first exchange key includes performing an operation on the public key copy of the second device and the private key that is used by the first device to perform key exchange, to obtain the first exchange key, and generating, based on the first exchange key, a master key used during a four-step handshake process.

With reference to the fifth possible implementation manner of the first aspect, in a tenth possible implementation manner, the method further includes performing a hash-based message authentication code operation on the encrypted configuration information using the first exchange key or a derivative key of the first exchange key as an input key of the hash-based message authentication code operation, and sending, to the second device, information on which the hash-based message authentication code operation has been performed.

With reference to the sixth possible implementation manner of the first aspect, in an eleventh possible implementation manner, after decrypting the received configuration information using the first exchange key, the method further includes generating configuration acknowledgment information, performing a hash-based message authentication code operation on the configuration acknowledgment information using the first exchange key or a derivative key of the first exchange key as an input key of the hash-based message authentication code operation, and sending, to the second device, information on which the hash-based message authentication code operation has been performed.

With reference to the seventh possible implementation manner of the first aspect, in a twelfth possible implementation manner, the method further includes performing a hash-based message authentication code operation on the encrypted public key operation value of the third device using the first exchange key or a derivative key of the first exchange key as an input key of the hash-based message authentication code operation, and sending, to the second device, information on which the hash-based message authentication code operation has been performed.

According to a second aspect, an embodiment of the present disclosure provides a network configuration method, including performing an operation of a preset algorithm on a public key that is used by a second device to perform key exchange, to obtain a public key operation value of the second device such that a first device acquires the public key operation value of the second device in an out-of-band manner, receiving public key information of the first device sent by the first device, and acquiring a public key of the first device according to the public key information of the first device, where the public key information of the first device is information that is generated by the first device according to the public key used to perform key exchange, sending public key information of the second device to the first device such that the first device acquires, according to the public key information of the second device, a public key copy of the second device that is used by the second device to perform key exchange, and generating a second exchange key according to a private key that is used by the second device to perform key exchange and the acquired public key of the first device in order to process configuration information between the first device and the second device using the second exchange key.

With reference to the second aspect, in a first possible implementation manner, before receiving public key information of the first device sent by the first device, the method further includes generating key information of the second device such that the first device acquires the key information of the second device in the out-of-band manner.

With reference to the first possible implementation manner of the second aspect, in a second possible implementation manner, the received public key information of the first device is information obtained by performing, by the first device using the key information of the second device as a symmetric encryption key, a symmetric encryption operation on the public key that is used by the first device to perform key exchange, and acquiring a public key of the first device according to the public key information of the first device includes decrypting the public key information of the first device using the second device key information of the second device, to obtain the public key of the first device.

With reference to the second aspect, or the first possible implementation manner of the second aspect, in a third possible implementation manner, the received public key information of the first device is information obtained by performing, by the first device using the public key operation value of the second device as a symmetric encryption key, a symmetric encryption operation on the public key that is used by the first device to perform key exchange, and acquiring a public key of the first device according to the public key information of the first device includes decrypting the public key information of the first device using the second device public key operation value of the second device, to obtain the public key of the first device.

With reference to the third possible implementation manner of the second aspect, in a fourth possible implementation manner, the public key information of the second device is information obtained by performing, by the second device, a symmetric encryption operation on the public key of the second device using a public key operation value of the first device as a symmetric encryption key, and the public key operation value of the first device is a result obtained by performing, by the second device, an operation of the preset algorithm on the acquired public key of the first device, or when the first device acquires the key information of the second device in the out-of-band manner, the public key information of the second device is information obtained by performing, by the second device, a symmetric encryption operation on the public key of the second device using the key information of the second device as a symmetric encryption key.

With reference to the second aspect, the first possible implementation manner of the second aspect, the second possible implementation manner of the second aspect, the third possible implementation manner of the second aspect, or the fourth possible implementation manner of the second aspect, in a fifth possible implementation manner, generating a second exchange key according to a private key that is used by the second device to perform key exchange and the acquired public key of the first device in order to process configuration information between the first device and the second device using the second exchange key includes receiving configuration information sent by the first device, where the configuration information is configuration information that is encrypted by the first device using a first exchange key as an encryption key, and the first exchange key is a result obtained by performing, by the first device, an operation on the public key copy of the second device and a private key of the first device, performing an operation on the private key that is used by the second device to perform key exchange and the acquired public key of the first device, to obtain the second exchange key, and decrypting the received configuration information using the second exchange key, or performing an operation on the private key that is used by the second device to perform key exchange and the acquired public key of the first device, to obtain the second exchange key, and encrypting the configuration information using the second exchange key as an encryption key, and sending encrypted configuration information to the first device.

With reference to the second aspect, the first possible implementation manner of the second aspect, the second possible implementation manner of the second aspect, the third possible implementation manner of the second aspect, or the fourth possible implementation manner of the second aspect, in a sixth possible implementation manner, generating a second exchange key according to a private key that is used by the second device to perform key exchange and the acquired public key of the first device in order to process configuration information between the first device and the second device using the second exchange key includes receiving an encrypted public key operation value of a third device that is sent by the first device, performing an operation on the private key that is used by the second device to perform key exchange and the acquired public key of the first device, to obtain the second exchange key, decrypting the encrypted public key operation value of the third device using the second exchange key, to obtain a public key operation value of the third device, performing key exchange with the third device using the public key operation value of the third device, and completing a final configuration process, where the encrypted public key operation value of the third device is a result obtained by encrypting, by the first device, the public key operation value of the third device using a first exchange key as an encryption key. The first exchange key is a result obtained by performing, by the first device, an operation on the private key of the first device and the public key copy of the second device, and the public key operation value of the third device is a result obtained by performing an operation of the preset algorithm on a public key that is used by the third device to perform key exchange.

With reference to the fifth possible implementation manner of the second aspect, in a seventh possible implementation manner, the method further includes receiving information which is sent by the first device and on which a hash-based message authentication code operation has been performed, and performing, using the second exchange key or a derivative key of the second exchange key as a decryption key of the hash-based message authentication code operation, decryption verification on the received information on which the hash-based message authentication code operation has been performed.

According to a third aspect, an embodiment of the present disclosure provides a network configuration apparatus, including a first acquiring module configured to acquire a public key operation value of a second device in an out-of-band manner, where the public key operation value of the second device is a result obtained by performing an operation of a preset algorithm on a public key that is used by the second device to perform key exchange, a first device public key information generating module configured to generate public key information of a first device according to a public key that is used by the first device to perform key exchange, a first sending module configured to send the public key information of the first device to the second device such that the second device acquires the public key of the first device according to the public key information of the first device, a second device public key copy acquiring module configured to acquire a public key copy of the second device that is sent by the second device and that is used to perform key exchange, and a first configuration module configured to perform an operation of the preset algorithm on the public key copy of the second device, to obtain a public key operation value copy of the second device, and after the public key operation value copy of the second device matches the public key operation value of the second device, generate a first exchange key according to a private key that is used by the first device to perform key exchange and the acquired public key copy of the second device in order to process configuration information between the first device and the second device using the first exchange key.

With reference to the third aspect, in a first possible implementation manner, the apparatus further includes a second acquiring module configured to acquire key information of the second device in the out-of-band manner.

With reference to the first possible implementation manner of the third aspect, in a second possible implementation manner, the first device public key information generating module includes a first encryption unit configured to perform, using the key information of the second device as a symmetric encryption key, a symmetric encryption operation on the public key that is used by the first device to perform key exchange, to generate the public key information of the first device.

With reference to the third aspect, or the first possible implementation manner of the third aspect, in a third possible implementation manner, the first device public key information generating module includes a second encryption unit configured to perform, using the public key operation value of the second device as a symmetric encryption key, a symmetric encryption operation on the public key that is used by the first device to perform key exchange, to generate the public key information of the first device.

With reference to the third possible implementation manner of the third aspect, in a fourth possible implementation manner, the second device public key copy acquiring module includes a first receiving unit and a first decryption and obtaining unit, where the first receiving unit is configured to receive public key information of the second device sent by the second device, where the public key information of the second device is information obtained by performing, by the second device, a symmetric encryption operation on the public key of the second device using a public key operation value of the first device as a symmetric encryption key, and the first decryption and obtaining unit is configured to decrypt the public key information of the second device using a first device public key operation value copy of the first device, to obtain the public key copy of the second device, where the public key operation value of the first device is a result obtained by performing, by the second device, an operation of the preset algorithm on the obtained public key of the first device, and the public key operation value copy of the first device is a result obtained by performing an operation of the preset algorithm on the public key of the first device, and/or a second receiving unit and a second decryption and obtaining unit, where the second receiving unit is configured to receive public key information of the second device sent by the second device, where when the first device acquires the key information of the second device in the out-of-band manner, the public key information of the second device is information obtained by performing, by the second device, a symmetric encryption operation on the public key of the second device using the key information of the second device as a symmetric encryption key, and the second decryption and obtaining unit is configured to decrypt the public key information of the second device using the key information of the second device acquired by the first device, to obtain the public key copy of the second device.

With reference to the third aspect, the first possible implementation manner of the third aspect, the second possible implementation manner of the third aspect, the third possible implementation manner of the third aspect, or the fourth possible implementation manner of the third aspect, in a fifth possible implementation manner, the first configuration module includes a first operation unit configured to perform an operation on the public key copy of the second device and the private key that is used by the first device to perform key exchange, to obtain the first exchange key, and a configuration information encryption unit configured to encrypt the configuration information using the first exchange key as an encryption key, and send encrypted configuration information to the second device.

With reference to the third aspect, the first possible implementation manner of the third aspect, the second possible implementation manner of the third aspect, the third possible implementation manner of the third aspect, or the fourth possible implementation manner of the third aspect, in a sixth possible implementation manner, the first configuration module includes a configuration information receiving unit configured to receive configuration information sent by the second device, where the configuration information sent by the second device is configuration information that is encrypted using a second exchange key as an encryption key, and the second exchange key is a result obtained by performing, by the second device, an operation on the obtained public key of the first device and a private key of the second device, a second operation unit configured to perform an operation on the public key copy of the second device and the private key that is used by the first device to perform key exchange, to obtain the first exchange key, and a decryption unit configured to decrypt the received configuration information using the first exchange key.

With reference to the third aspect, the first possible implementation manner of the third aspect, the second possible implementation manner of the third aspect, the third possible implementation manner of the third aspect, or the fourth possible implementation manner of the third aspect, in a seventh possible implementation manner, the first configuration module includes a third operation unit configured to perform an operation on the public key copy of the second device and the private key that is used by the first device to perform key exchange, to obtain the first exchange key, a public key operation value encryption unit configured to encrypt a public key operation value of a third device using the first exchange key as an encryption key, where the public key operation value of the third device is a result obtained by performing an operation of the preset algorithm on a public key that is used by the third device to perform key exchange, and a sending unit configured to send an encrypted public key operation value of the third device to the second device such that the second device can acquire the public key operation value of the third device securely, and performs key exchange with the third device using the public key operation value of the third device and completes a final configuration process.

With reference to the third aspect, the first possible implementation manner of the third aspect, the second possible implementation manner of the third aspect, the third possible implementation manner of the third aspect, or the fourth possible implementation manner of the third aspect, in an eighth possible implementation manner, the first configuration module includes a fourth operation unit configured to perform an operation on the public key copy of the second device and the private key that is used by the first device to perform key exchange, to obtain the first exchange key, and a session key generating unit configured to generate, based on the first exchange key, a session key used to protect service data transmission between the first device and the second device.

With reference to the third aspect, the first possible implementation manner of the third aspect, the second possible implementation manner of the third aspect, the third possible implementation manner of the third aspect, or the fourth possible implementation manner of the third aspect, in a ninth possible implementation manner, the first configuration module includes a fifth operation unit configured to perform an operation on the public key copy of the second device and the private key that is used by the first device to perform key exchange, to obtain the first exchange key, and a master key generating unit configured to generate, based on the first exchange key, a master key used during a four-step handshake process.

With reference to the fifth possible implementation manner of the third aspect, in a tenth possible implementation manner, the apparatus further includes a first hash operation module configured to perform a hash-based message authentication code operation on the encrypted configuration information using the first exchange key or a derivative key of the first exchange key as an input key of the hash-based message authentication code operation, and send, to the second device, information on which the hash-based message authentication code operation has been performed.

With reference to the sixth possible implementation manner of the third aspect, in an eleventh possible implementation manner, the apparatus further includes a second hash operation module configured to generate configuration acknowledgment information after the decryption unit decrypts the received configuration information, perform a hash-based message authentication code operation on the configuration acknowledgment information using the first exchange key or a derivative key of the first exchange key as an input key of the hash-based message authentication code operation, and send, to the second device, information on which the hash-based message authentication code operation has been performed.

With reference to the seventh possible implementation manner of the third aspect, in a twelfth possible implementation manner, the apparatus further includes a third hash operation module configured to perform a hash-based message authentication code operation on the encrypted public key operation value of the third device using the first exchange key or a derivative key of the first exchange key as an input key of the hash-based message authentication code operation, and send, to the second device, information on which the hash-based message authentication code operation has been performed.

According to a fourth aspect, an embodiment of the present disclosure provides a network configuration apparatus, including a second device public key operation value generating module configured to perform an operation of a preset algorithm on a public key that is used by a second device to perform key exchange, to obtain a public key operation value of the second device such that a first device acquires the public key operation value of the second device in an out-of-band manner, a receiving and acquiring module configured to receive public key information of the first device sent by the first device, and acquire a public key of the first device according to the public key information of the first device, where the public key information of the first device is information that is generated by the first device according to the public key used to perform key exchange, a second device public key information sending module configured to send public key information of the second device to the first device such that the first device acquires, according to the public key information of the second device, a public key copy of the second device that is used by the second device to perform key exchange, and a second configuration module configured to generate a second exchange key according to a private key that is used by the second device to perform key exchange and the acquired public key of the first device in order to process configuration information between the first device and the second device using the second exchange key.

With reference to the fourth aspect, in a first possible implementation manner, the network configuration device further includes a random key generating module configured to generate key information of the second device such that the first device acquires the key information of the second device in the out-of-band manner.

With reference to the first possible implementation manner of the fourth aspect, in a second possible implementation manner, the public key information of the first device received by the receiving and acquiring module is information obtained by performing, by the first device using the key information of the second device as a symmetric encryption key, a symmetric encryption operation on the public key that is used by the first device to perform key exchange, and the receiving and acquiring module includes a first decryption unit configured to decrypt the public key information of the first device using the second device key information of the second device, to obtain the public key of the first device.

With reference to the fourth aspect, or the first possible implementation manner of the fourth aspect, in a third possible implementation manner, the public key information of the first device received by the receiving and acquiring module is information obtained by performing, by the first device using the public key operation value of the second device as a symmetric encryption key, a symmetric encryption operation on the public key that is used by the first device to perform key exchange, and the receiving and acquiring module includes a second decryption unit configured to decrypt the public key information of the first device using the second device public key operation value of the second device, to obtain the public key of the first device.

With reference to the third possible implementation manner of the fourth aspect, in a fourth possible implementation manner, the network configuration device further includes a first generating module for public key information configured to perform a symmetric encryption operation on the public key of the second device using a public key operation value of the first device as a symmetric encryption key, to obtain the public key information of the second device, where the public key operation value of the first device is a result obtained by performing, by the second device, an operation of the preset algorithm on the obtained public key of the first device, or a second generating module for public key information configured to perform symmetric encryption on the public key of the second device using the key information of the second device, to obtain the public key information of the second device when the first device acquires the key information of the second device in the out-of-band manner.

With reference to the fourth aspect, the first possible implementation manner of the fourth aspect, the second possible implementation manner of the fourth aspect, the third possible implementation manner of the fourth aspect, or the fourth possible implementation manner of the fourth aspect, in a fifth possible implementation manner, the second configuration module further includes a configuration information receiving and decryption unit configured to receive configuration information sent by the first device, where the configuration information is configuration information that is encrypted by the first device using a first exchange key as an encryption key, and the first exchange key is a result obtained by performing, by the first device, an operation on the public key copy of the second device and a private key of the first device, perform an operation on the private key that is used by the second device to perform key exchange and the acquired public key of the first device, to obtain the second exchange key, and decrypt the received configuration information using the second exchange key, and/or a configuration information sending unit configured to perform an operation on the public key of the first device and the private key that is used by the second device to perform key exchange, to obtain the second exchange key, and encrypt the configuration information using the second exchange key as an encryption key, and send encrypted configuration information to the first device.

With reference to the fourth aspect, the first possible implementation manner of the fourth aspect, the second possible implementation manner of the fourth aspect, the third possible implementation manner of the fourth aspect, or the fourth possible implementation manner of the fourth aspect, in a sixth possible implementation manner, the second configuration module includes a third device public key operation value receiving and decryption unit configured to receive an encrypted public key operation value of a third device that is sent by the first device, perform an operation on the private key that is used by the second device to perform key exchange and the acquired public key of the first device, to obtain the second exchange key, and decrypt the encrypted public key operation value of the third device using the second exchange key, to obtain a public key operation value of the third device, where the encrypted public key operation value of the third device is a result obtained by encrypting, by the first device, the public key operation value of the third device using a first exchange key as an encryption key, the first exchange key is a result obtained by performing, by the first device, an operation on the public key copy of the second device and a private key of the first device, and the public key operation value of the third device is a result obtained by performing an operation of the preset algorithm on a public key that is used by the third device to perform key exchange, and a configuration subunit configured to perform key exchange with the third device using the public key operation value of the third device, and complete a final configuration process.

With reference to the fifth possible implementation manner of the fourth aspect, in a seventh possible implementation manner, the network configuration device further includes a hash operation verification module configured to receive information which is sent by the first device and on which a hash-based message authentication code operation has been performed, and perform, using the second exchange key or a derivative key of the second exchange key as a decryption key of the hash-based message authentication code operation, decryption verification on the received information on which the hash-based message authentication code operation has been performed.

According to a fifth aspect, an embodiment of the present disclosure provides a network device, including an input apparatus, an output apparatus, a memory, and a processor, where the memory is configured to store program code, and the processor is configured to invoke the program code stored by the memory, to perform the following steps: acquiring a public key operation value of a second device in an out-of-band manner using the input apparatus, where the public key operation value of the second device is a result obtained by performing an operation of a preset algorithm on a public key that is used by the second device to perform key exchange, generating public key information of a first device according to a public key that is used by the first device to perform key exchange, and sending the public key information of the first device to the second device using the output apparatus such that the second device acquires the public key of the first device according to the public key information of the first device, acquiring, using the input apparatus, a public key copy of the second device that is sent by the second device and that is used to perform key exchange, performing an operation of the preset algorithm on the public key copy of the second device, to obtain a public key operation value copy of the second device, and after the public key operation value copy of the second device matches the public key operation value of the second device, generating a first exchange key according to a private key that is used by the first device to perform key exchange and the acquired public key copy of the second device in order to process configuration information between the first device and the second device using the first exchange key.

With reference to the fifth aspect, in a first possible implementation manner, before generating public key information of a first device according to a public key that is used by the first device to perform key exchange, the processor further performs acquiring key information of the second device in the out-of-band manner using the input apparatus.

With reference to the first possible implementation manner of the fifth aspect, in a second possible implementation manner, generating, by the processor, public key information of a first device according to a public key that is used by the first device to perform key exchange includes performing, using the key information of the second device as a symmetric encryption key, a symmetric encryption operation on the public key that is used by the first device to perform key exchange, to generate the public key information of the first device.

With reference to the fifth aspect, or the first possible implementation manner of the fifth aspect, in a third possible implementation manner, generating, by the processor, public key information of a first device according to a public key that is used by the first device to perform key exchange includes performing, using the public key operation value of the second device as a symmetric encryption key, a symmetric encryption operation on the public key that is used by the first device to perform key exchange, to generate the public key information of the first device.

With reference to the third possible implementation manner of the fifth aspect, in a fourth possible implementation manner, acquiring, by the processor using the input apparatus, a public key copy of the second device that is sent by the second device and that is used to perform key exchange includes receiving, using the input apparatus, public key information of the second device sent by the second device, where the public key information of the second device is information obtained by performing, by the second device, a symmetric encryption operation on the public key of the second device using a public key operation value of the first device as a symmetric encryption key, decrypting the public key information of the second device using a first device public key operation value copy of the first device, to obtain the public key copy of the second device, where the public key operation value of the first device is a result obtained by performing, by the second device, an operation of the preset algorithm on the obtained public key of the first device, and the public key operation value copy of the first device is a result obtained by performing an operation of the preset algorithm on the public key of the first device, or receiving, using the input apparatus, public key information of the second device sent by the second device, where when the first device acquires the key information of the second device in the out-of-band manner, the public key information of the second device is information obtained by performing, by the second device, a symmetric encryption operation on the public key of the second device using the key information of the second device as a symmetric encryption key, and decrypting the public key information of the second device using the key information of the second device acquired by the first device, to obtain the public key copy of the second device.

With reference to the fifth aspect, the first possible implementation manner of the fifth aspect, the second possible implementation manner of the fifth aspect, the third possible implementation manner of the fifth aspect, or the fourth possible implementation manner of the fifth aspect, in a fifth possible implementation manner, generating, by the processor, a first exchange key according to a private key that is used by the first device to perform key exchange and the acquired public key copy of the second device in order to process configuration information between the first device and the second device using the first exchange key includes performing an operation on the public key copy of the second device and the private key that is used by the first device to perform key exchange, to obtain the first exchange key, and encrypting the configuration information using the first exchange key as an encryption key, and sending encrypted configuration information to the second device.

With reference to the fifth aspect, the first possible implementation manner of the fifth aspect, the second possible implementation manner of the fifth aspect, the third possible implementation manner of the fifth aspect, or the fourth possible implementation manner of the fifth aspect, in a sixth possible implementation manner, generating, by the processor, a first exchange key according to a private key that is used by the first device to perform key exchange and the acquired public key copy of the second device in order to process configuration information between the first device and the second device using the first exchange key includes receiving, using the input apparatus, configuration information sent by the second device, where the configuration information sent by the second device is configuration information that is encrypted using a second exchange key as an encryption key, and the second exchange key is a result obtained by performing, by the second device, an operation on the obtained public key of the first device and a private key of the second device, performing an operation on the public key copy of the second device and the private key that is used by the first device to perform key exchange, to obtain the first exchange key, and decrypting the received configuration information using the first exchange key.

With reference to the fifth aspect, the first possible implementation manner of the fifth aspect, the second possible implementation manner of the fifth aspect, the third possible implementation manner of the fifth aspect, or the fourth possible implementation manner of the fifth aspect, in a seventh possible implementation manner, generating, by the processor, a first exchange key according to a private key that is used by the first device to perform key exchange and the acquired public key copy of the second device in order to process configuration information between the first device and the second device using the first exchange key includes performing an operation on the public key copy of the second device and the private key that is used by the first device to perform key exchange, to obtain the first exchange key, encrypting a public key operation value of a third device using the first exchange key as an encryption key, where the public key operation value of the third device is a result obtained by performing an operation of the preset algorithm on a public key that is used by the third device to perform key exchange, sending an encrypted public key operation value of the third device to the second device such that the second device can acquire the public key operation value of the third device securely, and performs key exchange with the third device using the public key operation value of the third device and completes a final configuration process.

With reference to the fifth aspect, the first possible implementation manner of the fifth aspect, the second possible implementation manner of the fifth aspect, the third possible implementation manner of the fifth aspect, or the fourth possible implementation manner of the fifth aspect, in an eighth possible implementation manner, generating, by the processor, a first exchange key according to a private key that is used by the first device to perform key exchange and the acquired public key copy of the second device in order to process configuration information between the first device and the second device using the first exchange key includes performing an operation on the public key copy of the second device and the private key that is used by the first device to perform key exchange, to obtain the first exchange key, and generating, based on the first exchange key, a session key used to protect service data transmission between the first device and the second device.

With reference to the fifth aspect, the first possible implementation manner of the fifth aspect, the second possible implementation manner of the fifth aspect, the third possible implementation manner of the fifth aspect, or the fourth possible implementation manner of the fifth aspect, in a ninth possible implementation manner, generating, by the processor, a first exchange key according to a private key that is used by the first device to perform key exchange and the acquired public key copy of the second device in order to process configuration information between the first device and the second device using the first exchange key includes performing an operation on the public key copy of the second device and the private key that is used by the first device to perform key exchange, to obtain the first exchange key, and generating, based on the first exchange key, a master key used during a four-step handshake process.

With reference to the fifth possible implementation manner of the fifth aspect, in a tenth possible implementation manner, after decrypting the received configuration information using the first exchange key, the processor further performs a hash-based message authentication code operation on the encrypted configuration information using the first exchange key or a derivative key of the first exchange key as an input key of the hash-based message authentication code operation, and sending, to the second device using the output apparatus, information on which the hash-based message authentication code operation has been performed.

With reference to the sixth possible implementation manner of the fifth aspect, in an eleventh possible implementation manner, the processor further performs generating configuration acknowledgment information, performing a hash-based message authentication code operation on the configuration acknowledgment information using the first exchange key or a derivative key of the first exchange key as an input key of the hash-based message authentication code operation, and sending, to the second device using the output apparatus, information on which the hash-based message authentication code operation has been performed.

With reference to the seventh possible implementation manner of the fifth aspect, in a twelfth possible implementation manner, the processor further performs a hash-based message authentication code operation on the encrypted public key operation value of the third device using the first exchange key or a derivative key of the first exchange key as an input key of the hash-based message authentication code operation, and sending, to the second device using the output apparatus, information on which the hash-based message authentication code operation has been performed.

According to a sixth aspect, an embodiment of the present disclosure provides a network device, including an input apparatus, an output apparatus, a memory, and a processor, where the memory is configured to store program code, and the processor is configured to invoke the program code stored by the memory, to perform the following steps: performing an operation of a preset algorithm on a public key that is used by a second device to perform key exchange, to obtain a public key operation value of the second device such that a first device acquires the public key operation value of the second device in an out-of-band manner, receiving, using the input apparatus, public key information of the first device sent by the first device, and acquiring a public key of the first device according to the public key information of the first device, where the public key information of the first device is information that is generated by the first device according to the public key used to perform key exchange, sending public key information of the second device to the first device using the output apparatus such that the first device acquires, according to the public key information of the second device, a public key copy of the second device that is used by the second device to perform key exchange, and generating a second exchange key according to a private key that is used by the second device to perform key exchange and the acquired public key of the first device in order to process configuration information between the first device and the second device using the second exchange key.

With reference to the sixth aspect, in a first possible implementation manner, before receiving, using the input apparatus, public key information of the first device sent by the first device, the processor further performs generating key information of the second device such that the first device acquires the key information of the second device in the out-of-band manner.

With reference to the first possible implementation manner of the sixth aspect, in a second possible implementation manner, the public key information of the first device received by the processor using the input apparatus is information obtained by performing, by the first device using the key information of the second device as a symmetric encryption key, a symmetric encryption operation on the public key that is used by the first device to perform key exchange, and acquiring, by the processor, a public key of the first device according to the public key information of the first device includes decrypting the public key information of the first device using the second device key information of the second device, to obtain the public key of the first device.

With reference to the sixth aspect, or the first possible implementation manner of the sixth aspect, in a third possible implementation manner, the public key information of the first device received using the input apparatus is information obtained by performing, by the first device using the public key operation value of the second device as a symmetric encryption key, a symmetric encryption operation on the public key that is used by the first device to perform key exchange, and acquiring, by the processor, a public key of the first device according to the public key information of the first device includes decrypting the public key information of the first device using the second device public key operation value of the second device, to obtain the public key of the first device.

With reference to the third possible implementation manner of the sixth aspect, in a fourth possible implementation manner, the public key information of the second device is information obtained by performing, by the processor, symmetric encryption on the public key of the second device using a public key operation value of the first device, and the public key operation value of the first device is a result obtained by performing, by the processor, an operation of the preset algorithm on the acquired public key of the first device, or when the first device acquires the key information of the second device in the out-of-band manner, the public key information of the second device is information obtained by performing, by the processor, symmetric encryption on the public key of the second device using the key information of the second device.

With reference to the sixth aspect, the first possible implementation manner of the sixth aspect, the second possible implementation manner of the sixth aspect, the third possible implementation manner of the sixth aspect, or the fourth possible implementation manner of the sixth aspect, in a fifth possible implementation manner, generating, by the processor, a second exchange key according to a private key that is used by the second device to perform key exchange and the acquired public key of the first device in order to process configuration information between the first device and the second device using the second exchange key includes receiving, using the input apparatus, configuration information sent by the first device, where the configuration information is configuration information that is encrypted by the first device using the first exchange key as an encryption key, and the first exchange key is a result obtained by performing, by the first device, an operation on the public key copy of the second device and a private key of the first device, performing an operation on the private key that is used by the second device to perform key exchange and the acquired public key of the first device, to obtain the second exchange key, and decrypting the received configuration information using the second exchange key, or performing an operation on the private key that is used by the second device to perform key exchange and the acquired public key of the first device, to obtain the second exchange key, and encrypting the configuration information using the second exchange key as an encryption key, and sending encrypted configuration information to the first device using the output apparatus.

With reference to the sixth aspect, the first possible implementation manner of the sixth aspect, the second possible implementation manner of the sixth aspect, the third possible implementation manner of the sixth aspect, or the fourth possible implementation manner of the sixth aspect, in a sixth possible implementation manner, generating, by the processor, a second exchange key according to a private key that is used by the second device to perform key exchange and the acquired public key of the first device in order to process configuration information between the first device and the second device using the second exchange key includes receiving, using the input apparatus, an encrypted public key operation value of a third device that is sent by the first device, performing an operation on the private key that is used by the second device to perform key exchange and the acquired public key of the first device, to obtain the second exchange key, decrypting the encrypted public key operation value of the third device using the second exchange key, to obtain a public key operation value of the third device, performing key exchange with the third device using the public key operation value of the third device, and completing a final configuration process, where the encrypted public key operation value of the third device is a result obtained by encrypting, by the first device, the public key operation value of the third device using the first exchange key as an encryption key. The first exchange key is a result obtained by performing, by the first device, an operation on the public key copy of the second device and a private key of the first device, and the public key operation value of the third device is a result obtained by performing an operation of the preset algorithm on a public key that is used by the third device to perform key exchange.

With reference to the fifth possible implementation manner of the sixth aspect, in a seventh possible implementation manner, the processor further performs receiving, using the input apparatus, information which is sent by the first device and on which a hash-based message authentication code operation has been performed, and performing, using the second exchange key or a derivative key of the second exchange key as a decryption key of the hash-based message authentication code operation, decryption verification on the information which is received using the input apparatus and on which the hash-based message authentication code operation has been performed.

According to a seventh aspect, an embodiment of the present disclosure provides a network configuration system, including a first device and a second device, where the first device is the network device in the fifth aspect, the first possible implementation manner of the fifth aspect, the second possible implementation manner of the fifth aspect, the third possible implementation manner of the fifth aspect, the fourth possible implementation manner of the fifth aspect, the fifth possible implementation manner of the fifth aspect, the sixth possible implementation manner of the fifth aspect, the seventh possible implementation manner of the fifth aspect, the eighth possible implementation manner of the fifth aspect, the ninth possible implementation manner of the fifth aspect, the tenth possible implementation manner of the fifth aspect, the eleventh possible implementation manner of the fifth aspect, or the twelfth possible implementation manner of the fifth aspect, and the second device is the network device according to the sixth aspect, the first possible implementation manner of the sixth aspect, the second possible implementation manner of the sixth aspect, the third possible implementation manner of the sixth aspect, the fourth possible implementation manner of the sixth aspect, the fifth possible implementation manner of the sixth aspect, the sixth possible implementation manner of the sixth aspect, or the seventh possible implementation manner of the sixth aspect.

By means of implementation of the embodiments of the present disclosure, an operation is performed on a public key to obtain a public key operation value, and the public key for key exchange is encrypted using the public key operation value as an encryption key, which can significantly improve the security of a configuration process, in interaction information of the configuration process, the public key is replaced with the public key operation value, which can reduce content of the interaction information, and improve the utilization of out-of-band channels of both devices. Moreover, configuration can be completed in a configuration manner of scanning multi-dimensional codes, which resolves problems in the prior art that a PIN manner is relatively complex and not secure, a PBC manner is not sufficiently secure, and NFC has relatively low universality. Besides, as compared with performing multi-dimensional code encoding on a public key, content in multi-dimensional code encoding is significantly reduced, which lowers requirements on display, scanning, and decoding of multi-dimensional codes, achieves high universality, greatly improves configuration efficiency, and significantly improves configuration experience of users.

BRIEF DESCRIPTION OF DRAWINGS

To describe the technical solutions in the embodiments of the present disclosure or in the prior art more clearly, the following briefly describes the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
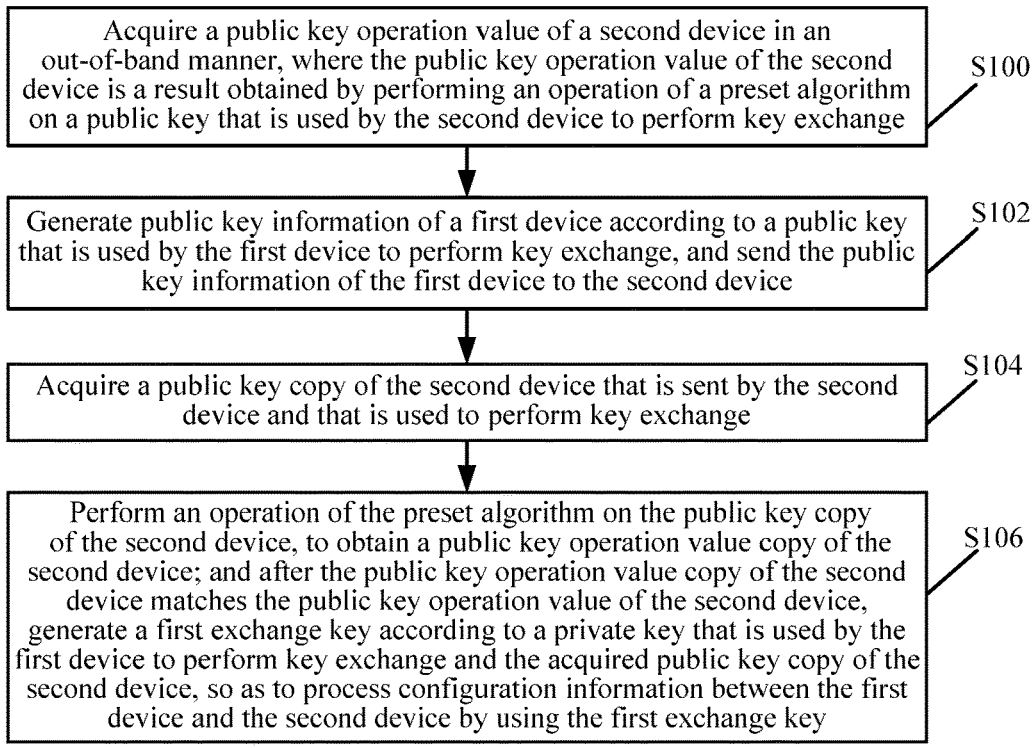
FIG. 1 is a schematic flowchart of a first embodiment of a network configuration method according to the present disclosure.

Refer to FIG. 1, which is a schematic flowchart of a first embodiment of a network configuration method according to the present disclosure. The method includes the following steps.

Step S100: Acquire a public key operation value of a second device in an out-of-band manner, where the public key operation value of the second device is a result obtained by performing an operation of a preset algorithm on a public key that is used by the second device to perform key exchange.

Network configuration is performed for a first device and the second device. For example, the first device is a smart phone, and the second terminal is a smart tablet, and after a network configuration process, the first device and the second device have shared key information, or the first device is a configurator device of a radio access point, and the second device is a wireless terminal that needs to access the radio access point, and after the network configuration, the first device sends credential information of the radio access point to the second device, for example, an authentication material such as a master key for a four-step handshake. The second device has its own public/private key pair, and after performing the operation of the preset algorithm on the public key thereof, the second device can obtain the public key operation value of the second device. The preset algorithm includes, but is not limited to, a hash algorithm, where the hash algorithm may be secure hash algorithm (SHA)-256, SHA-224, message digest algorithm 5 (MD5), or the like, but is not limited thereto.

In this embodiment of the present disclosure, the SHA-256 is used as an example for description. An output of the SHA-256 is a 256-bit hash value, where the hash value can be directly used as an operation value of the public key, and the operation thereof is shown as follows:

operation value of public key PKey=SHA-256(PKey).

Alternatively, the output may be truncated, for example, the first 128 bits or last 128 bits after truncation are used as the operation value of the public key, and the operation thereof is shown as follows:

operation value of public key PKey=first 128 bits of SHA-256(PKey).

Further optionally, device information is also added to the operation, where the device information includes a media access control (MAC) address, a device type, and the like, and the operation is shown as follows:

operation value of public keyPKey=SHA-256(PKey-||MAC_address||device type).

Further optionally, when the device is not restricted by a user interface (UI) function, before the operation for obtaining the operation value of the public key, device information of another device may be obtained, and the device information of the other device is added to the operation, where the device information includes a MAC address, a device type, and the like. The operation is shown as follows:

operation value of public key PKey=SHA-256(PKey-||MAC_address of a peer).

In addition, the public key operation value of the device may also be obtained in another manner, for example, obtained by directly taking bits of the public key PKey. The operation is shown as follows:

operation value of public key PKey=first 128 bits of PKey.

In step S100, the first device may acquire the public key operation value of the second device using multiple out-of-band manners, which include, but are not limited to, the following three acquiring manners:

Manner a: The second device encodes the obtained public key operation value (where it may be assumed that the public key operation value of the second device to be acquired by the first device is an out-of-band second public key operation value) into a multi-dimensional code, and after obtaining the multi-dimensional code by means of scanning or the like, the first device performs decoding to obtain the public key operation value of the second device. According to different device capabilities, the multi-dimensional code may be a static multi-dimensional code, such as a label-print multi-dimensional code that is pasted to a device during manufacturing or delivery, or the multi-dimensional code may be a dynamic multi-dimensional code, for example, the second device dynamically generates a multi-dimensional code and displays the multi-dimensional code on a screen. A multi-dimensional code system may be any readable one-dimensional code system or two-dimensional code system, such as a universal product code (UPC), or a quick response code (QR Code). The present disclosure is not limited thereto. The first device has functions of acquiring and identifying a multi-dimensional code in order to obtain the multi-dimensional code and decode the multi-dimensional code to obtain the public key operation value of the second device.

Manner b: The first device obtains an out-of-band second public key operation value by means of NFC. For example, the first device obtains the out-of-band second public key operation value using an NFC interface, and further, the first device may obtain the out-of-band second public key operation value using an NFC active mode or an NFC passive mode. Alternatively, the second device sends, by means of other wireless low-power communications such as a low-power BLUETOOTH or low-power WI-FI manner, a packet that carries the out-of-band second public key operation value to the first device.

Manner c. The first device obtains an out-of-band second public key operation value by receiving an input on a human-computer interaction interface, for example, receiving the out-of-band second public key operation value that is entered by a user using a keyboard, or receiving the out-of-band second public key operation value that is entered from a universal serial bus (USB) interface.

Step S102: Generate public key information of a first device according to a public key that is used by the first device to perform key exchange, and send the public key information of the first device to the second device.

Furthermore, the public key information of the first device may be information obtained after processing such as encryption is performed on the public key used to perform key exchange. In this case, after obtaining the public key information of the first device, the second device performs corresponding processing such as decryption, to obtain the public key that is used by the first device to perform key exchange.

Step S104: Acquire a public key copy of the second device that is sent by the second device and that is used to perform key exchange.

Step S106: Perform an operation of the preset algorithm on the public key copy of the second device, to obtain a public key operation value copy of the second device, and after the public key operation value copy of the second device matches the public key operation value of the second device, generate a first exchange key according to a private key that is used by the first device to perform key exchange and the acquired public key copy of the second device, so as to process configuration information between the first device and the second device by using the first exchange key.

Furthermore, for the algorithm of the operation that is performed by the first device on the public key copy of the second device, refer to the operation algorithm described in step S100, and details are not described herein again. The first device compares the public key operation value copy of the second device that is obtained after the operation and the public key operation value of the second device obtained in step S100, and it indicates that matching is determined as successful, and it is confirmed that a received message is a message sent from the second device if the public key operation value copy of the second device is equal to the public key operation value of the second device. Therefore, further configuration can be performed. The first exchange key is generated according to the private key that is used by the first device to perform key exchange and the acquired public key copy of the second device in order to process the configuration information between the first device and the second device using the first exchange key.

Further, before step S102 in this embodiment of the present disclosure, the method may further include acquiring key information of the second device in the out-of-band manner. That is, the key information of the second device may be acquired while acquiring a public key operation value of a second device in an out-of-band manner in step S100 is performed. The key information of the second device includes, but is not limited to, being randomly generated by the second device, being configured into the second device in a manufacturing process, or being configured into the second device by a user and then provided for the first device in the out-of-band manner.

Figure 2:
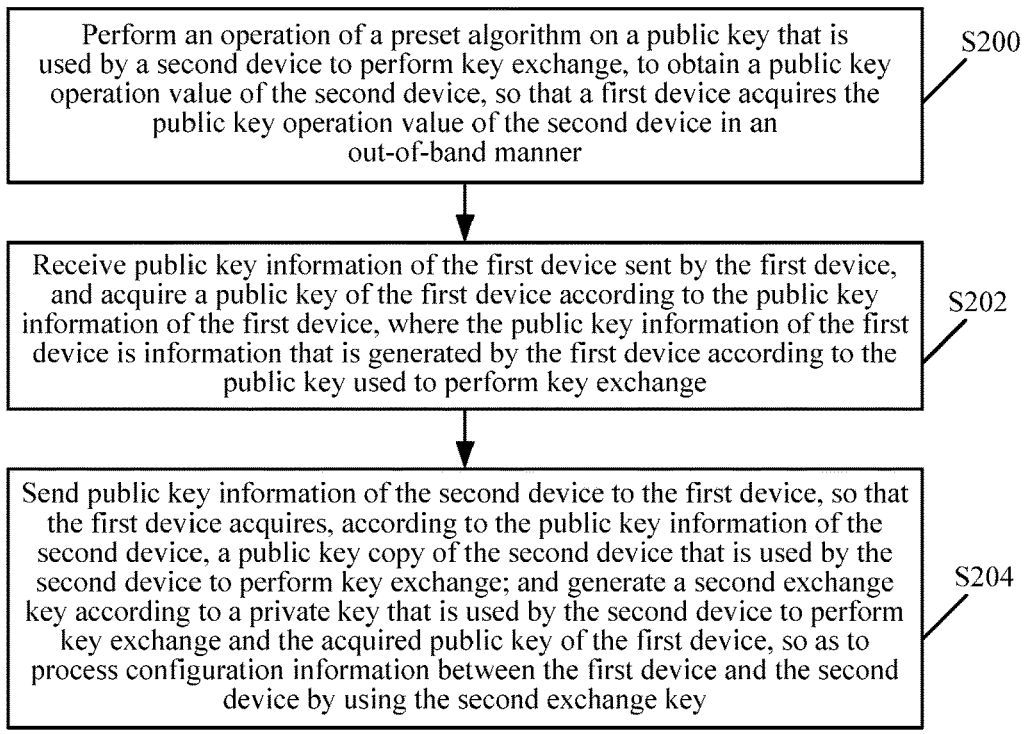
FIG. 2 is a schematic flowchart of a second embodiment of a network configuration method according to the present disclosure.

For better implementation of the foregoing solution of this embodiment of the present disclosure, a configuration process is described in the following from the perspective of a second device end and with reference to FIG. 2 that shows a schematic flowchart of a second embodiment of a network configuration method according to the present disclosure. The method includes the following steps.

Step S200: Perform an operation of a preset algorithm on a public key that is used by a second device to perform key exchange, to obtain a public key operation value of the second device, so that a first device acquires the public key operation value of the second device in an out-of-band manner.

Furthermore, the second device has its own public/private key pair, that is, a private key of the second device (assuming to be Key_second device) and the public key of the second device (assuming to be PKey_second device). For the algorithm of the operation performed by the second device on the public key of the second device, refer to the operation algorithm described in step S100 in the embodiment of FIG. 1, and details are not described herein again. It can be understood that, the public key operation value of the second device (assuming to be PKey_second device operation) in this embodiment of the present disclosure may also be a public key operation derivative value (assuming to be Pkey_second device_derivation) obtained by means of the operation of the foregoing algorithm, and a derivation manner thereof includes, but is not limited to, performing a derivation operation such as hashing, shifting, or inversion on a value that is obtained after the operation is performed on the public key.

Step S202: Receive public key information of the first device sent by the first device, and acquire a public key of the first device according to the public key information of the first device, where the public key information of the first device is information that is generated by the first device according to the public key used to perform key exchange.

Step S204: Send public key information of the second device to the first device, so that the first device acquires, according to the public key information of the second device, a public key copy of the second device that is used by the second device to perform key exchange; and generate a second exchange key according to a private key that is used by the second device to perform key exchange and the acquired public key of the first device, so as to process configuration information between the first device and the second device by using the second exchange key.

Moreover, an operation of the preset algorithm is performed on the public key copy of the second device, to obtain a public key operation value copy of the second device, and after the public key operation value copy of the second device matches the public key operation value of the second device, the first device accepts received configuration information that is sent by the second device, or generates configuration information and sends the configuration information to the second device.

Further, the public key information of the second device may be the public key of the second device directly, that is, after receiving the public key information of the second device, the first device directly obtains the public key copy of the second device, or the public key information of the second device may also be information obtained after processing such as encryption is performed on the public key of the second device, and in this case, after receiving the public key information of the second device, the first device performs corresponding processing such as decryption, to obtain the public key copy of the second device, and performs an operation of the preset algorithm on the public key copy of the second device, to obtain the public key operation value copy of the second device. After the public key operation value copy of the second device matches the public key operation value of the second device, a first exchange key is generated according to a private key that is used by the first device to perform key exchange and the acquired public key copy of the second device in order to process configuration information between the first device and the second device using the first exchange key.

An implementation solution of the present disclosure is further described in the following with reference to FIG. 3 that shows a schematic flowchart of a third embodiment of a network configuration method according to the present disclosure.

Step S300: A second device performs an operation of a preset algorithm on a public key that is used by the second device to perform key exchange, to obtain a public key operation value of the second device such that a first device acquires the public key operation value of the second device in an out-of-band manner.

The second device has its own public/private key pair, that is, a private key of the second device (assuming to be Key_second device) and the public key of the second device (assuming to be PKey_second device). For the algorithm of the operation performed by the second device on the public key of the second device, refer to the operation algorithm described in step S100 in the embodiment of FIG. 1, and details are not described herein again. It can be understood that, the public key operation value of the second device (assuming to be PKey_second device_operation) in this embodiment of the present disclosure may also be a public key operation derivative value (assuming to be Pkey_second device_derivation) obtained by means of the operation of the foregoing algorithm, and a derivation manner thereof includes, but is not limited to, performing a derivation operation such as hashing, shifting, or inversion on a value that is obtained after the operation is performed on the public key.

Step S302: The first device acquires the public key operation value of the second device and key information of the second device in the out-of-band manner.

An acquiring manner may be the manner described in step S100 in the embodiment of FIG. 1, and details are not described herein again.

Step S304: The first device performs, using the key information of the second device as a symmetric encryption key, a symmetric encryption operation on a public key that is used by the first device to perform key exchange, to generate public key information of the first device.

Step S306: Send the public key information of the first device to the second device.

Step S308: The second device decrypts the public key information of the first device using the second device key information of the second device, to obtain the public key of the first device.

Step S310: Send a public key copy, used to perform key exchange, of the second device to the first device.

Step S312: The first device performs an operation of the preset algorithm on the received public key copy of the second device, to obtain a public key operation value copy of the second device.

It can be understood that, for the algorithm of the operation that is performed by the first device on the public key copy of the second device, refer to the operation algorithm described in step S100 in the embodiment of FIG. 1, and details are not described herein again.

Step S314: The first device determines whether the public key operation value copy of the second device matches the public key operation value of the second device.

The first device compares the public key operation value copy of the second device that is obtained after the operation and the public key operation value of the second device obtained in step S302, and it indicates that matching is determined as successful, it is confirmed that a received message is a message sent from the second device, and step S316 is performed, to perform further configuration if the public key operation value copy of the second device is equal to the public key operation value of the second device, otherwise, step S318 is performed, to terminate a configuration process.

Step S316: Generate a first exchange key according to a private key that is used by the first device to perform key exchange and the acquired public key copy of the second device in order to process configuration information between the first device and the second device using the first exchange key.

Step S318: Terminate a configuration process.

Figure 4:
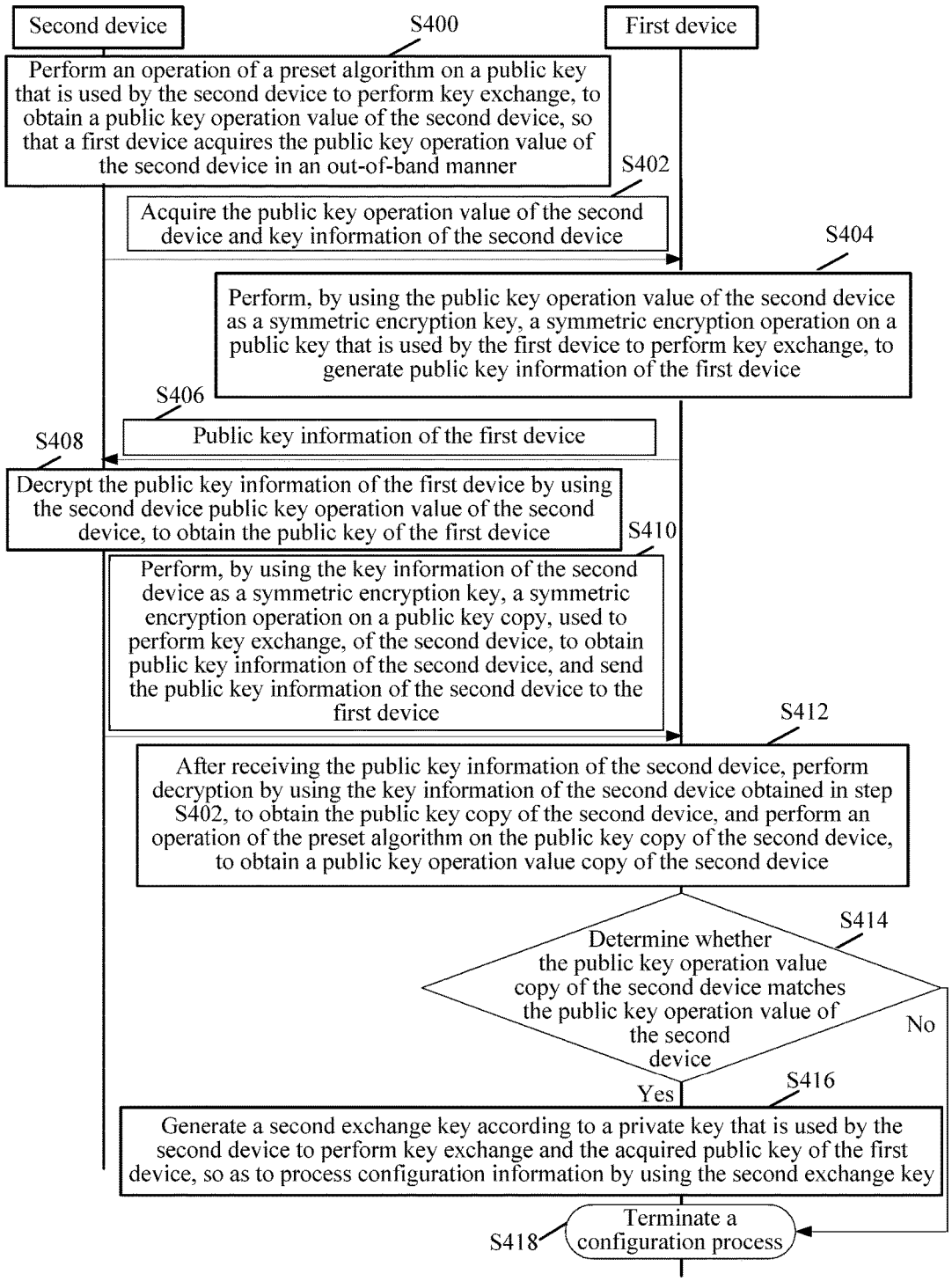
FIG. 4 is a schematic flowchart of a fourth embodiment of a network configuration method according to the present disclosure.

An implementation solution of the present disclosure is further described in the following with reference to FIG. 4 that shows a schematic flowchart of a fourth embodiment of a network configuration method according to the present disclosure.

Step S400: A second device performs an operation of a preset algorithm on a public key that is used by the second device to perform key exchange, to obtain a public key operation value of the second device such that a first device acquires the public key operation value of the second device in an out-of-band manner.

Figure 3:
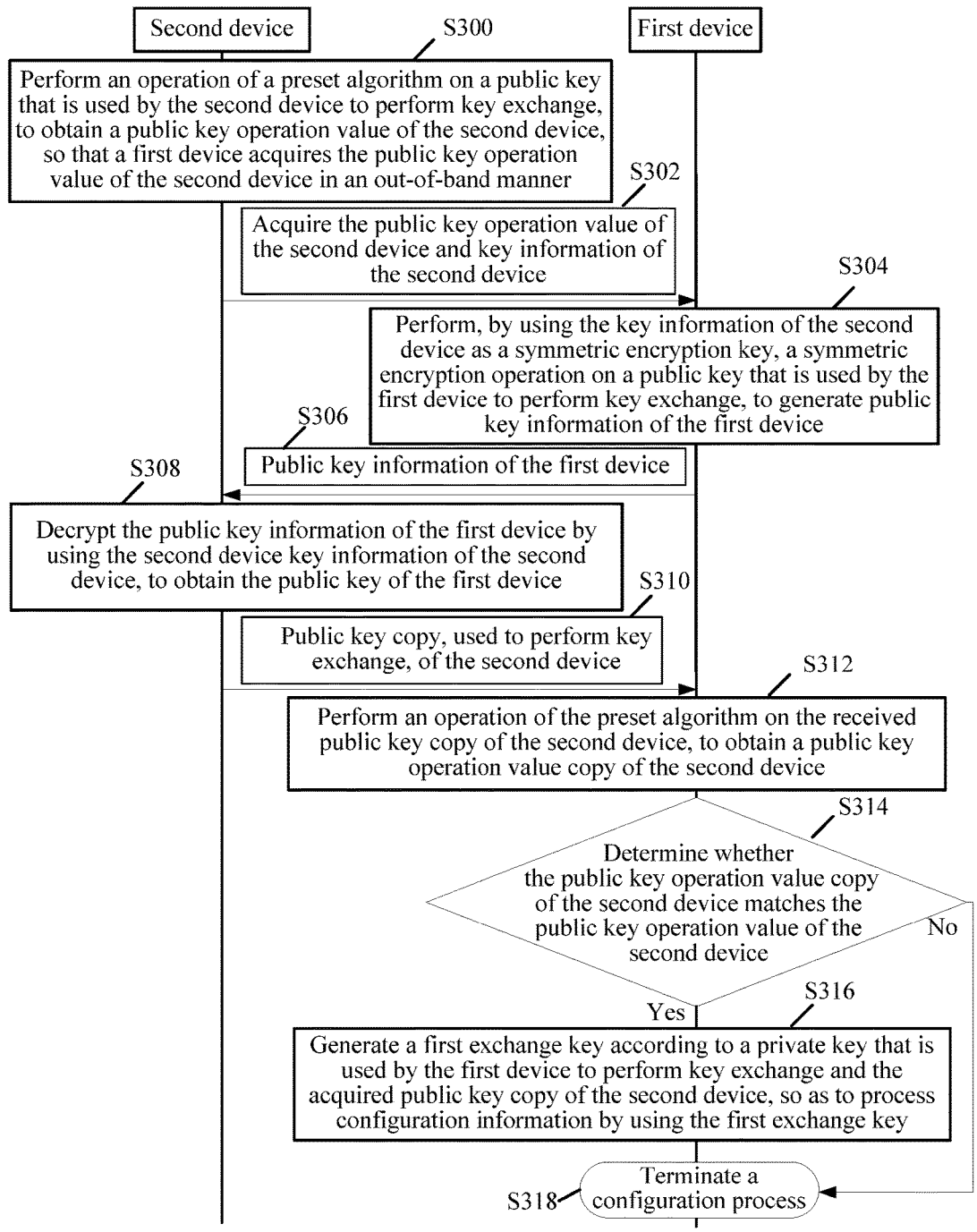
FIG. 3 is a schematic flowchart of a third embodiment of a network configuration method according to the present disclosure.

Further, refer to step S300 in the embodiment of FIG. 3, and details are not described herein again.

Step S402: The first device acquires the public key operation value of the second device and key information of the second device in the out-of-band manner.

An acquiring manner may be the manner described in step S100 in the embodiment of FIG. 1, and details are not described herein again.

Step S404: The first device performs, using the public key operation value of the second device as a symmetric encryption key, a symmetric encryption operation on a public key that is used by the first device to perform key exchange, to generate public key information of the first device.

Step S406: Send the public key information of the first device to the second device.

Step S408: The second device decrypts the public key information of the first device using the second device public key operation value of the second device, to obtain the public key of the first device.

Step S410: The second device performs, using the key information of the second device as a symmetric encryption key, a symmetric encryption operation on a public key copy, used to perform key exchange, of the second device, to obtain public key information of the second device, and sends the public key information of the second device to the first device.

Step S412: After receiving the public key information of the second device, the first device performs decryption using the key information of the second device obtained in step S402, to obtain the public key copy of the second device, and performs an operation of the preset algorithm on the public key copy of the second device, to obtain a public key operation value copy of the second device.

It can be understood that, for the algorithm of the operation that is performed by the first device on the public key copy of the second device, refer to the operation algorithm described in step S100 in the embodiment of FIG. 1, and details are not described herein again.

Step S414: The first device determines whether the public key operation value copy of the second device matches the public key operation value of the second device.

The first device compares the public key operation value copy of the second device that is obtained after the operation and the public key operation value of the second device obtained in step S402, and it indicates that matching is determined as successful, it is confirmed that a received message is a message sent from the second device, and step S416 is performed, to perform further configuration if the public key operation value copy of the second device is equal to the public key operation value of the second device, otherwise, step S418 is performed, to terminate a configuration process.

Step S416: Generate a second exchange key according to a private key that is used by the second device to perform key exchange and the acquired public key of the first device in order to process configuration information between the first device and the second device using the second exchange key.

Step S418: Terminate a configuration process.

Figure 5:
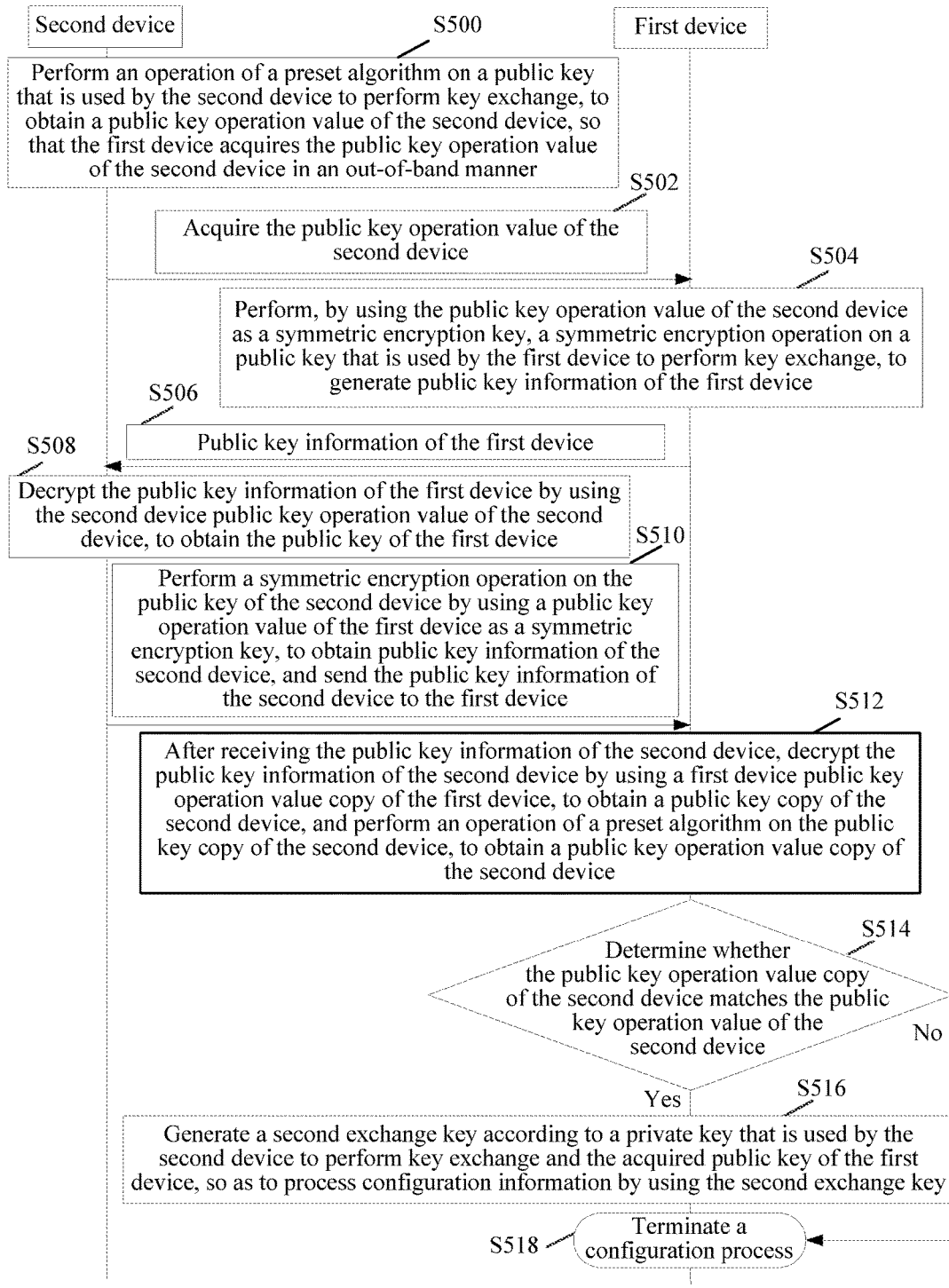
FIG. 5 is a schematic flowchart of a fifth embodiment of a network configuration method according to the present disclosure.

It should be noted that, this embodiment of the present disclosure may be implemented without using the key information of the second device. An implementation solution of the present disclosure is further described with reference to FIG. 5 that shows a schematic flowchart of a fifth embodiment of a network configuration method according to the present disclosure.

Step S500: A second device performs an operation of a preset algorithm on a public key that is used by the second device to perform key exchange, to obtain a public key operation value of the second device such that a first device acquires the public key operation value of the second device in an out-of-band manner.

Step S502: The first device acquires the public key operation value of the second device in the out-of-band manner.

An acquiring manner may be the manner described in step S100 in the embodiment of FIG. 1, and details are not described herein again.

Step S504: The first device performs, using the public key operation value of the second device as a symmetric encryption key, a symmetric encryption operation on a public key that is used by the first device to perform key exchange, to generate public key information of the first device.

Step S506: Send the public key information of the first device to the second device.

Step S508: The second device decrypts the public key information of the first device using the second device public key operation value of the second device, to obtain the public key of the first device.

Step S510: The second device performs a symmetric encryption operation on the public key of the second device using a public key operation value of the first device as a symmetric encryption key, to obtain public key information of the second device, and sends the public key information of the second device to the first device.

The second device performs an operation on the public key of the first device that is obtained by means of decryption, to obtain the public key operation value of the first device, where for the algorithm of the operation, refer to the operation algorithm described in step S100 in the embodiment of FIG. 1, and details are not described herein again.

Step S512: After receiving the public key information of the second device, the first device decrypts the public key information of the second device using a first device public key operation value copy of the first device, to obtain a public key copy of the second device, and performs an operation of the preset algorithm on the public key copy of the second device, to obtain a public key operation value copy of the second device.

The first device performs an operation of the preset algorithm on the public key of the first device to obtain the public key operation value copy of the first device, and then decrypts the public key information of the second device using the public key operation value copy of the first device, to obtain the public key copy of the second device. It can be understood that, for the preset operation algorithm, refer to the operation algorithm described in step S100 in the embodiment of FIG. 1, and details are not described herein again.

Step S514: The first device determines whether the public key operation value copy of the second device matches the public key operation value of the second device.

The first device compares the public key operation value copy of the second device that is obtained after the operation and the public key operation value of the second device obtained in step S502, and it indicates that matching is determined as successful, it is confirmed that a received message is a message sent from the second device, and step S516 is performed, to perform further configuration if the public key operation value copy of the second device is equal to the public key operation value of the second device, otherwise, step S518 is performed, to terminate a configuration process.

Step S516: Generate a second exchange key according to a private key that is used by the second device to perform key exchange and the acquired public key of the first device in order to process configuration information between the first device and the second device using the second exchange key.

Step S518: Terminate a configuration process.

Further, the step of generating a second exchange key according to a private key that is used by the second device to perform key exchange and the acquired public key of the first device in order to process configuration information between the first device and the second device using the second exchange key in step S316, step S416, and step S516 in the embodiments of the present disclosure may include generating, by the first device, configuration information, and sending the configuration information to the second device, or generating, by the second device, configuration information, and sending the configuration information to the first device. Furthermore, the step may include performing an operation on the public key copy of the second device and a private key that is used by the first device to perform key exchange, to obtain a first exchange key when the first device generates configuration information and sends the configuration information to the second device, and encrypting the configuration information using the first exchange key as an encryption key, and sending encrypted configuration information to the second device.

It can be understood that, the first device may use a DH key exchange algorithm to generate the first exchange key, and a calculation manner may be: the first exchange key=the public key copy of the second device ^ the private key of the first device. However, the embodiments of the present disclosure are not limited to performing the operation using the DH key exchange algorithm.

Still, in the embodiments of the present disclosure, before step S316, step S416, and step S516, or after step S316, step S416, and step S516, or while step S316, step S416, and step S516 are performed, the method may further include that the first device performs, using the first exchange key or a derivative key of the first exchange key as an input key of a hash-based message authentication code (HMAC) operation, the HMAC operation on the encrypted configuration information, and sends, to the second device, information on which the HMAC operation has been performed such that after receiving the information on which the HMAC operation has been performed, the second device performs, on the information on which the HMAC operation has been performed, decryption verification using the second exchange key or a derivative key of the second exchange key as a decryption key of the HMAC operation, to verify whether the message has been tampered.

When the second device generates configuration information and sends the configuration information to the first device, accepting, by the first device, the received configuration information that is sent by the second device may include receiving the configuration information sent by the second device, where the configuration information sent by the second device is configuration information that is encrypted using a second exchange key as an encryption key, and the second exchange key is a result obtained by performing, by the second device, an operation on the obtained public key of the first device and a private key of the second device, performing an operation on the public key copy of the second device and the private key that is used by the first device to perform key exchange, to obtain the first exchange key, and decrypting the received configuration information using the first exchange key.

It can be understood that, the second device may use the DH key exchange algorithm to generate the second exchange key, and a calculation manner may be: the second exchange key=the public key of the first device ^ the private key of the second device. However, the embodiments of the present disclosure are not limited to performing the operation using the DH key exchange algorithm.

Still further, in the embodiments of the present disclosure, after the first device decrypts the received configuration information using the first exchange key, the method may further include that the first device generates configuration acknowledgment information, performs an HMAC operation on the configuration acknowledgment information using the first exchange key or a derivative key of the first exchange key as an input key of the HMAC operation, and sends, to the second device, information on which the HMAC operation has been performed such that after receiving the information on which the HMAC operation has been performed, the second device performs, using the second exchange key or a derivative key of the second exchange key as a decryption key of the HMAC operation, decryption verification on the information on which the HMAC operation has been performed, to verify whether the message has been tampered.

It should be noted that, after the second device receives the configuration information sent by the first device, according to different application scenarios, a network between the first device and the second device may be established using the following manners.

Manner 1: When the first device and the second device are to be connected using a Peer to Peer network (P2P), the configuration information sent by the first device includes a credential of the connection between the first device and the second device, where the credential is used for performing a verification process in a four-step handshake process during a connection process between the first device and the second device, and after the verification succeeds, the first device and the second device establish a P2P connection.

Manner 2: When the first device is a terminal, and the second device is an AP supporting the 802.11 protocol, the configuration information sent by the first device includes a credential of a connection between the first device and the second device, where the credential is used for performing a verification process in a four-step handshake process during a connection process between the first device and the second device. After the verification succeeds, the first device and the second device establish a connection, and the first device joins a network on which the second device is located.

Manner 3: When the first device is an AP, and the second device is a terminal, the first device may obtain the public key operation value of the second device from an external device, and the configuration information sent by the first device includes a credential of a connection between the first device and the second device, where the credential is used for performing a verification process in a four-step handshake process during a connection process between the first device and the second device. After the verification succeeds, the first device and the second device establish a connection, and the second device joins a network on which the first device is located.

It can be understood that, the configuration information may be initiated by the first device or the second device, and this embodiment merely uses an example in which the configuration information is sent by the first device. When the second device sends configuration information, the second device may also encrypt the configuration information using the second exchange key or a derivative key of the second exchange key, and may send the configuration information together with the foregoing message that is used to send the public key of the second device (that is, a second message), or may wait until the first device sends a trigger message, and then send the configuration information to the first device. In the embodiments of the present disclosure, the configuration information may be information including a credential or the configuration information is information including an authentication key.

Still further, in some configuration scenarios, when both devices are UI restricted devices, one device cannot securely obtain a public key operation value of the other device, and in this case, a third-party device needs to be used to assist in configuration and connection of the two devices to be configured and connected.

Furthermore, assuming that the first device in the foregoing embodiments of FIG. 1, FIG. 2, FIG. 3, FIG. 4, and FIG. 5 is the third-party device, when the first device generates configuration information and sends the configuration information to the second device, step S316, step S416, and step S516 may include performing an operation on the public key copy of the second device and the private key that is used by the first device to perform key exchange, to obtain the first exchange key, encrypting a public key operation value of a third device using the first exchange key as an encryption key, where the public key operation value of the third device is a result obtained by performing an operation of the preset algorithm on a public key that is used by the third device to perform key exchange, sending an encrypted public key operation value of the third device to the second device such that the second device can acquire the public key operation value of the third device securely, and performs key exchange with the third device using the public key operation value of the third device and completes a final configuration process.

The embodiments of the present disclosure may further include performing, by the first device, an HMAC operation on the encrypted public key operation value of the third device using the first exchange key or a derivative key of the first exchange key as an input key of the HMAC operation, and sending, to the second device, information on which the HMAC operation has been performed such that after receiving the information on which the HMAC operation has been performed, the second device performs, using the second exchange key or a derivative key of the second exchange key as a decryption key of the HMAC operation, decryption verification on the received information on which the HMAC operation has been performed, to verify whether the message has been tampered.

In some configuration scenarios, the third-party device may further perform network configuration and connection interaction with the two to-be-configured devices separately according to any embodiment in FIG. 1, FIG. 2, FIG. 3, FIG. 4, and FIG. 5 of the present disclosure, and sends verification information for connection or configuration separately. Furthermore, according to any embodiment in FIG. 1, FIG. 2, FIG. 3, FIG. 4, and FIG. 5 of the present disclosure, after the third-party device separately performs discovery, authentication, association, and secure key exchange with the two to-be-configured devices, the third-party device sends configuration information to the two to-be-configured devices separately. The configuration information is information that is used by the two to-be-configured devices for four-step handshake verification, or verification information that is used by the two to-be-configured devices for a next configuration process.

It should further be noted that, the first device acquires information of the second device in the out-of-band manner, for example, acquiring the information of the second device by scanning a multi-dimensional code, and in addition to the public key operation value of the second device and the key information of the second device, the first device may further acquire device information of the second device, such as a MAC address and a device type, and a priority channel of the second device.

Step S316, step S416, and step S516 in the embodiments of the present disclosure may further be performing an operation on the public key copy of the second device and the private key that is used by the first device to perform key exchange, to obtain the first exchange key, and generating, based on the first exchange key, a session key used to protect service data transmission between the first device and the second device. That is, the first device and the second device may not need to perform a four-step handshake process, and may use the first exchange key as a session key for data encryption, to protect secure transmission of service data between the two devices.

Step S316, step S416, and step S516 in the embodiments of the present disclosure may further be performing an operation on the public key copy of the second device and the private key that is used by the first device to perform key exchange, to obtain the first exchange key, and generating, based on the first exchange key, a master key used during a four-step handshake process. That is, the first device may use the first exchange key as a master key (pairwise master key (PMK)) in the four-step handshake process, and generate a session key using the PMK in order to protect data transmission.

It can be understood that, the symmetric algorithm in the embodiments of the present disclosure includes, but is not limited to, advanced encryption standard (AES). Generally, an encryption key of the AES encryption algorithm has 128 bits, 192 bits or 256 bits, and in the embodiments of the present disclosure, a length of 128 bits may be selected.

Meanwhile, to further protect message integrity, an integrity check operation may be performed on an interaction message, to determine whether the message has been tampered.

It can be understood that, in the embodiments of the present disclosure, a 256-bit message digest is obtained by means of an HMAC-SHA-256 operation. Optionally, in the embodiments of the present disclosure, a message digest of a current message may be, but is not limited to, the first 64 bits, and the message digest is carried in the current message, and is used by a peer device to perform a message integrity check after the peer device receives the current message, to determine whether the message has been tampered.

In implementation of the embodiments of the present disclosure, an operation is performed on a public key to obtain a public key operation value, and the public key for key exchange is encrypted using the public key operation value as an encryption key, which can significantly improve the security of a configuration process. In interaction information of the configuration process, the public key is replaced with the public key operation value, which can reduce content of the interaction information, and improve the utilization of out-of-band channels of both devices. Moreover, configuration can be completed in a configuration manner of scanning multi-dimensional codes, which resolves problems in the prior art that a PIN manner is relatively complex and not secure, a PBC manner is not sufficiently secure, and NFC has relatively low universality. Besides, as compared with performing multi-dimensional code encoding on a public key, content in multi-dimensional code encoding is significantly reduced, which lowers requirements on display, scanning, and decoding of multi-dimensional codes, achieves high universality, greatly improves configuration efficiency, and significantly improves configuration experience of users.

For better implementation of the foregoing solutions of the embodiments of the present disclosure, the present disclosure further provides a related apparatus configured to cooperatively implement the foregoing solutions. Detailed descriptions are provided in the following with reference to FIG. 6 that shows a schematic structural diagram of a first embodiment of a network configuration apparatus according to the present disclosure.

Figure 6:
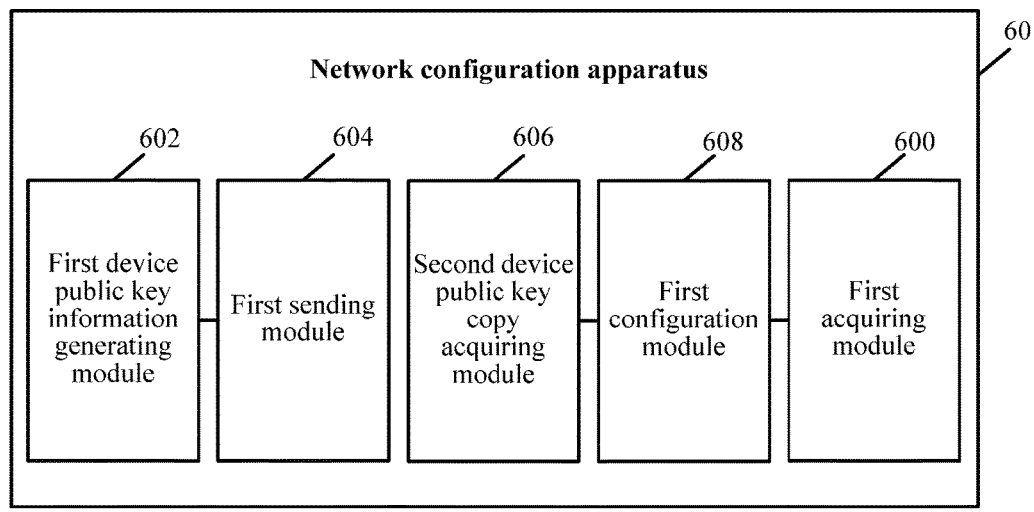
FIG. 6 is a schematic structural diagram of a first embodiment of a network configuration apparatus according to the present disclosure.

A network configuration apparatus 60, according to FIG. 6 includes a first acquiring module 600, a first device public key information generating module 602, a first sending module 604, a second device public key copy acquiring module 606, and a first configuration module 608, where the first acquiring module 600 is configured to acquire a public key operation value of a second device in an out-of-band manner, where the public key operation value of the second device is a result obtained by performing an operation of a preset algorithm on a public key that is used by the second device to perform key exchange. The first device public key information generating module 602 is configured to generate public key information of a first device according to a public key that is used by the first device to perform key exchange. The first sending module 604 is configured to send the public key information of the first device to the second device such that the second device acquires the public key of the first device according to the public key information of the first device. The second device public key copy acquiring module 606 is configured to acquire a public key copy of the second device that is sent by the second device and that is used to perform key exchange, and the first configuration module 608 is configured to perform an operation of the preset algorithm on the public key copy of the second device, to obtain a public key operation value copy of the second device, and after the public key operation value copy of the second device matches the public key operation value of the second device, generate a first exchange key according to a private key that is used by the first device to perform key exchange and the acquired public key copy of the second device in order to process configuration information between the first device and the second device using the first exchange key.

Figure 7:
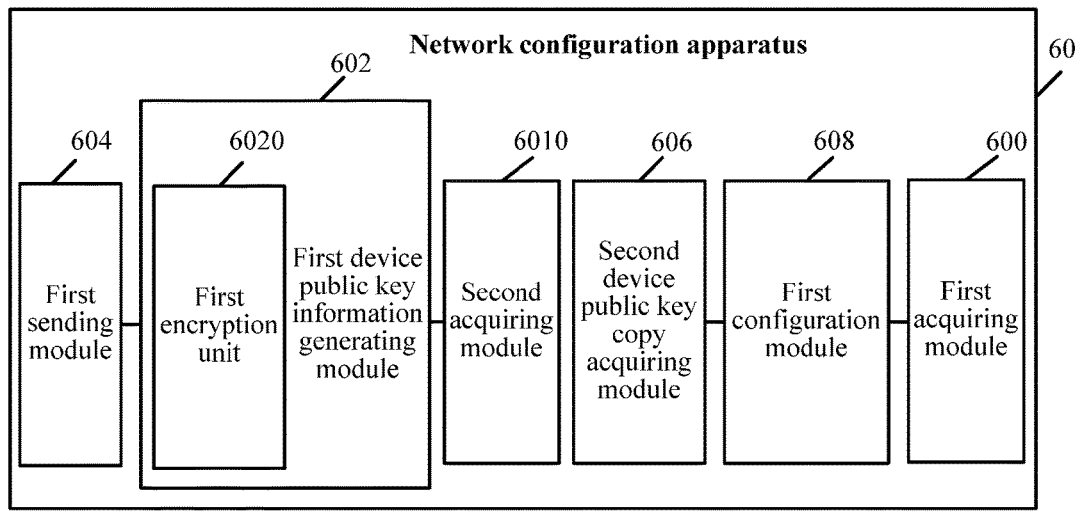
FIG. 7 is a schematic structural diagram of a second embodiment of a network configuration apparatus according to the present disclosure.

Further, with reference to FIG. 7 that shows a schematic structural diagram of a second embodiment of a network configuration apparatus according to the present disclosure, in addition to the first acquiring module 600, the first device public key information generating module 602, the first sending module 604, the second device public key copy acquiring module 606, and the first configuration module 608, the network configuration apparatus 60 may further include a second acquiring module 6010, where the second acquiring module 6010 is configured to acquire key information of the second device in the out-of-band manner, and the first device public key information generating module 602 may further include a first encryption unit 6020 configured to perform, using the key information of the second device as a symmetric encryption key, a symmetric encryption operation on the public key that is used by the first device to perform key exchange, to generate the public key information of the first device.

Figure 8:
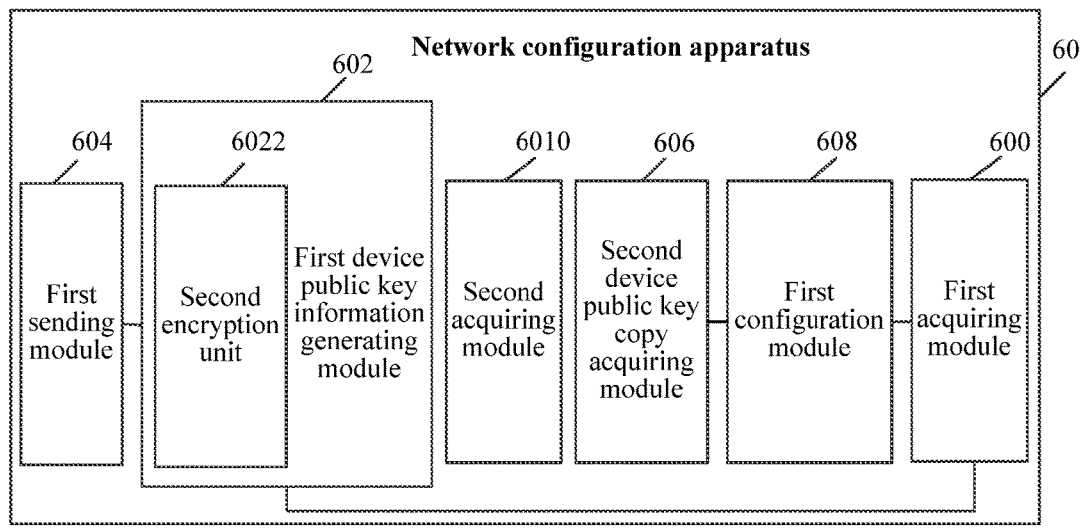
FIG. 8 is a schematic structural diagram of a third embodiment of a network configuration apparatus according to the present disclosure.

Still further, with reference to FIG. 8 that shows a schematic structural diagram of a third embodiment of a network configuration apparatus according to the present disclosure, the first device public key information generating module 602 in the network configuration apparatus 60 may further include a second encryption unit 6022 configured to perform, using the public key operation value of the second device as a symmetric encryption key, a symmetric encryption operation on the public key that is used by the first device to perform key exchange, to generate the public key information of the first device.

Figure 9:
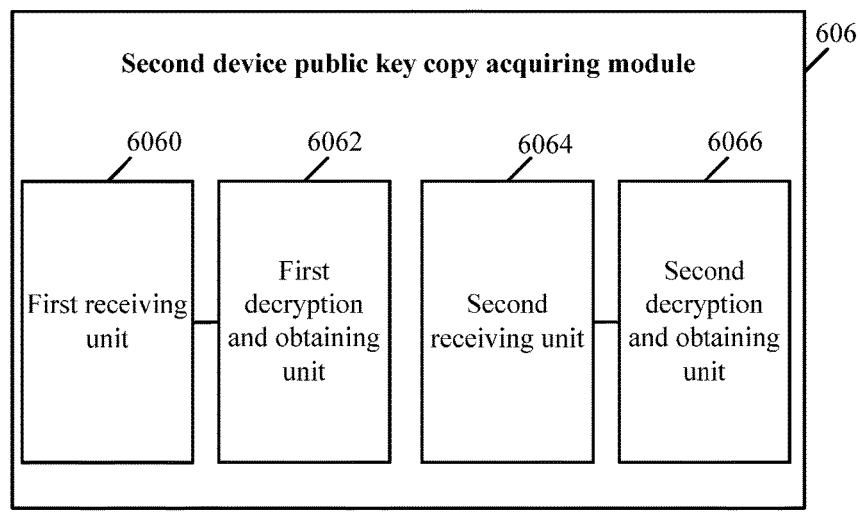
FIG. 9 is a schematic structural diagram of a second device public key copy acquiring module according to an embodiment of the present disclosure.

Still further, as shown in FIG. 9, which is a schematic structural diagram of a second device public key copy acquiring module according to an embodiment of the present disclosure, the second device public key copy acquiring module 606 may further include a first receiving unit 6060 and a first decryption and obtaining unit 6062, and/or a second receiving unit 6064 and a second decryption and obtaining unit 6066. In all the embodiments of the present disclosure, an example in which the second device public key copy acquiring module 606 includes the first receiving unit 6060, the first decryption and obtaining unit 6062, the second receiving unit 6064, and the second decryption and obtaining unit 6066 is used for description, where the first receiving unit 6060 is configured to receive public key information of the second device sent by the second device, where the public key information of the second device is information obtained by performing, by the second device, a symmetric encryption operation on the public key of the second device using a public key operation value of the first device as a symmetric encryption key. The first decryption and obtaining unit 6062 is configured to decrypt the public key information of the second device using a first device public key operation value copy of the first device, to obtain the public key copy of the second device, where the public key operation value of the first device is a result obtained by performing, by the second device, an operation of a preset algorithm on the acquired public key of the first device, and the public key operation value copy of the first device is a result obtained by performing an operation of the preset algorithm on the public key of the first device. The second receiving unit 6064 is configured to receive the public key information of the second device sent by the second device, where when the first device acquires the key information of the second device in the out-of-band manner, the public key information of the second device is information obtained by performing, by the second device, a symmetric encryption operation on the public key of the second device using the key information of the second device as a symmetric encryption key, and the second decryption and obtaining unit 6066 is configured to decrypt the public key information of the second device using the key information of the second device acquired by the first device, to obtain the public key copy of the second device.

Figure 10:
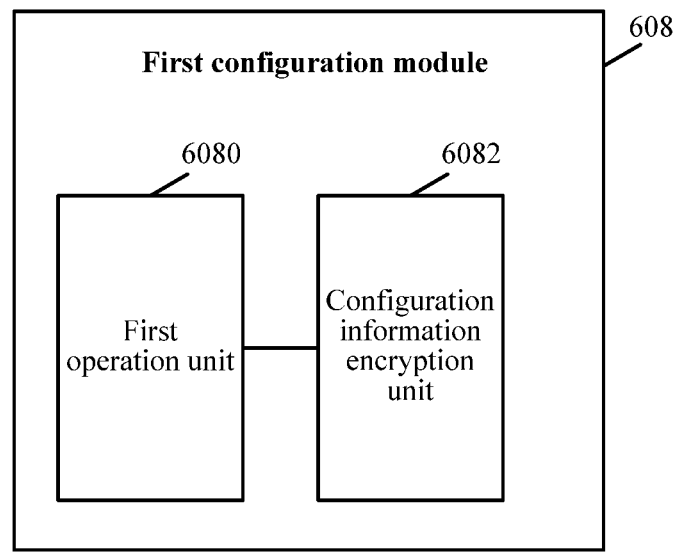
FIG. 10 is a schematic structural diagram of a first embodiment of a first configuration module according to the present disclosure.

Still further, as shown in FIG. 10, which is a schematic structural diagram of a first embodiment of a first configuration module according to the present disclosure, the first configuration module 608 may include a first operation unit 6080 and a configuration information encryption unit 6082, where the first operation unit 6080 is configured to perform an operation on the public key copy of the second device and the private key of the first device, to obtain the first exchange key, and the configuration information encryption unit 6082 is configured to encrypt the configuration information using the first exchange key as an encryption key, and send encrypted configuration information to the second device.

Figure 11:
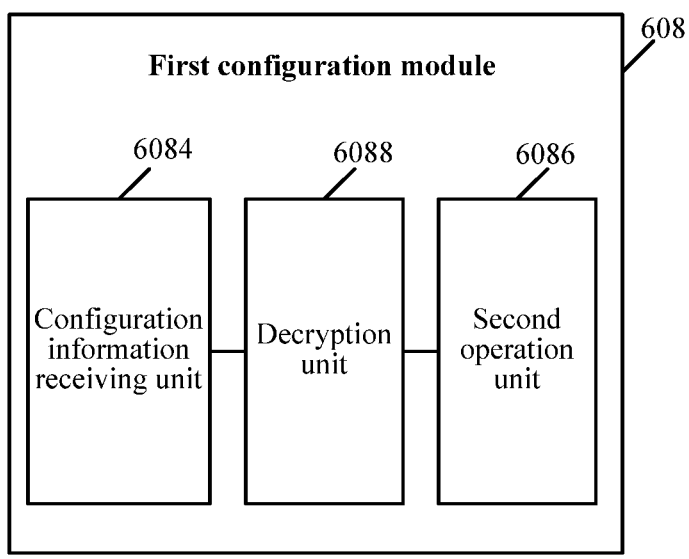
FIG. 11 is a schematic structural diagram of a second embodiment of a first configuration module according to the present disclosure.

Still further, as shown in FIG. 11, which is a schematic structural diagram of a second embodiment of a first configuration module according to the present disclosure, the first configuration module 608 may include a configuration information receiving unit 6084, a second operation unit 6086, and a decryption unit 6088, where the configuration information receiving unit 6084 is configured to receive configuration information sent by the second device, where the configuration information sent by the second device is configuration information that is encrypted using a second exchange key as an encryption key, and the second exchange key is a result obtained by performing, by the second device, an operation on the obtained public key of the first device and a private key of the second device, and the second operation unit 6086 is configured to perform an operation on the public key copy of the second device and the private key that is used by the first device to perform key exchange, to obtain the first exchange key, and the decryption unit 6088 is configured to decrypt the received configuration information using the first exchange key.

Figure 12:
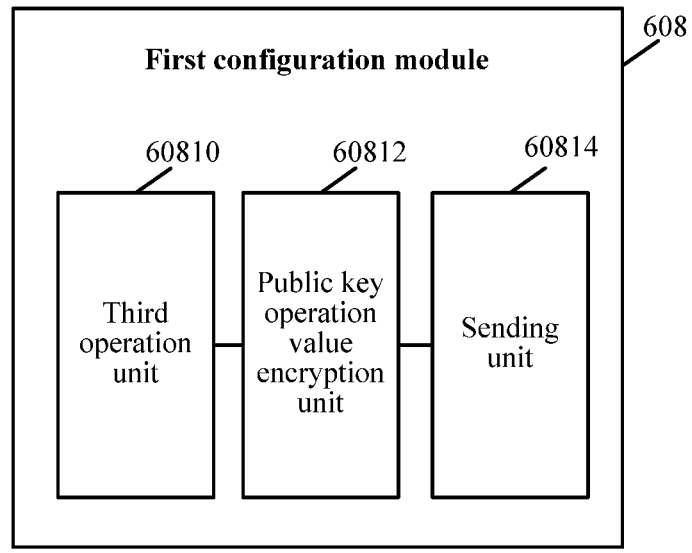
FIG. 12 is a schematic structural diagram of a third embodiment of a first configuration module according to the present disclosure.

Still further, as shown in FIG. 12, which is a schematic structural diagram of a third embodiment of a first configuration module according to the present disclosure, the first configuration module 608 may include a third operation unit 60810, a public key operation value encryption unit 60812, and a sending unit 60814, where the third operation unit 60810 is configured to perform an operation on the public key copy of the second device and the private key that is used by the first device to perform key exchange, to obtain the first exchange key. The public key operation value encryption unit 60812 is configured to encrypt a public key operation value of a third device using the first exchange key as an encryption key, where the public key operation value of the third device is a result obtained by performing an operation of the preset algorithm on a public key that is used by the third device to perform key exchange, and the sending unit 60814 is configured to send an encrypted public key operation value of the third device to the second device such that the second device can acquire the public key operation value of the third device securely, and performs key exchange with the third device using the public key operation value of the third device and completes a final configuration process.

Figure 13:
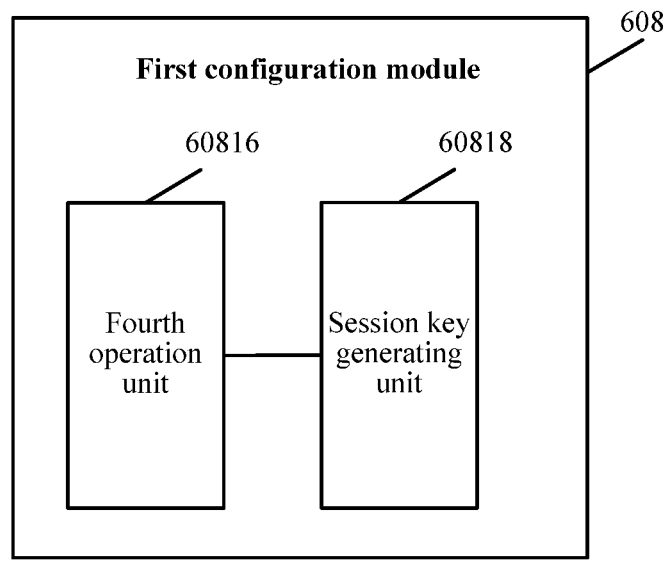
FIG. 13 is a schematic structural diagram of a fourth embodiment of a first configuration module according to the present disclosure.

Still further, as shown in FIG. 13, which is a schematic structural diagram of a fourth embodiment of a first configuration module according to the present disclosure, the first configuration module 608 may include a fourth operation unit 60816 and a session key generating unit 60818, where the fourth operation unit 60816 is configured to perform an operation on the public key copy of the second device and the private key that is used by the first device to perform key exchange, to obtain the first exchange key, and the session key generating unit 60818 is configured to generate, based on the first exchange key, a session key used to protect service data transmission between the first device and the second device.

Figure 14:
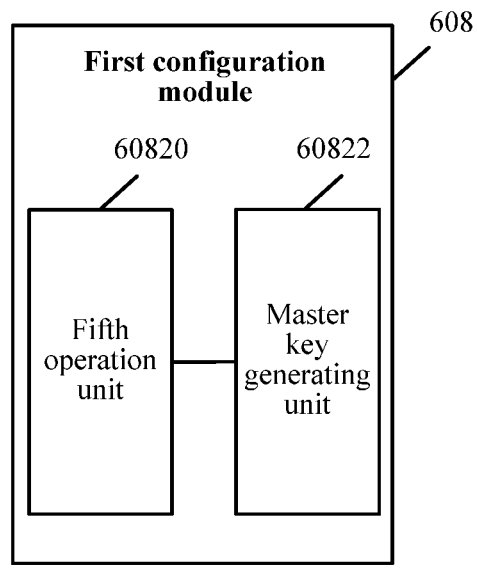
FIG. 14 is a schematic structural diagram of a fifth embodiment of a first configuration module according to the present disclosure.

Still further, as shown in FIG. 14, which is a schematic structural diagram of a fifth embodiment of a first configuration module according to the present disclosure, the first configuration module 608 may include a fifth operation unit 60820 and a master key generating unit 60822, where the fifth operation unit 60820 is configured to perform an operation on the public key copy of the second device and the private key that is used by the first device to perform key exchange, to obtain the first exchange key, and the master key generating unit 60822 is configured to generate, based on the first exchange key, a master key used during a four-step handshake process.

Still further, the network configuration apparatus 60 may further include a first hash operation module (not shown) configured to perform a hash-based message authentication code operation on the encrypted configuration information using the first exchange key or a derivative key of the first exchange key as an input key of the hash-based message authentication code operation, and send, to the second device, information on which the hash-based message authentication code operation has been performed.

Still further, the network configuration apparatus 60 may further include a second hash operation module (not shown) configured to generate configuration acknowledgment information after the decryption unit 6088 decrypts the received configuration information, perform a hash-based message authentication code operation on the configuration acknowledgment information using the first exchange key or a derivative key of the first exchange key as an input key of the hash-based message authentication code operation, and send, to the second device, information on which the hash-based message authentication code operation has been performed.

Still further, the network configuration apparatus 60 may further include a third hash operation module (not shown) configured to perform a hash-based message authentication code operation on the encrypted public key operation value of the third device using the first exchange key or a derivative key of the first exchange key as an input key of the hash-based message authentication code operation, and send, to the second device, information on which the hash-based message authentication code operation has been performed.

It should be noted that, functions of the functional modules in the network configuration apparatus 60 in this embodiment of the present disclosure may be further implemented according to the methods in the foregoing method embodiments, that is, further refer to the foregoing method embodiments related to the first device in FIG. 1, FIG. 2, FIG. 3, FIG. 4, and FIG. 5, and details are not described herein again.

Figure 15:
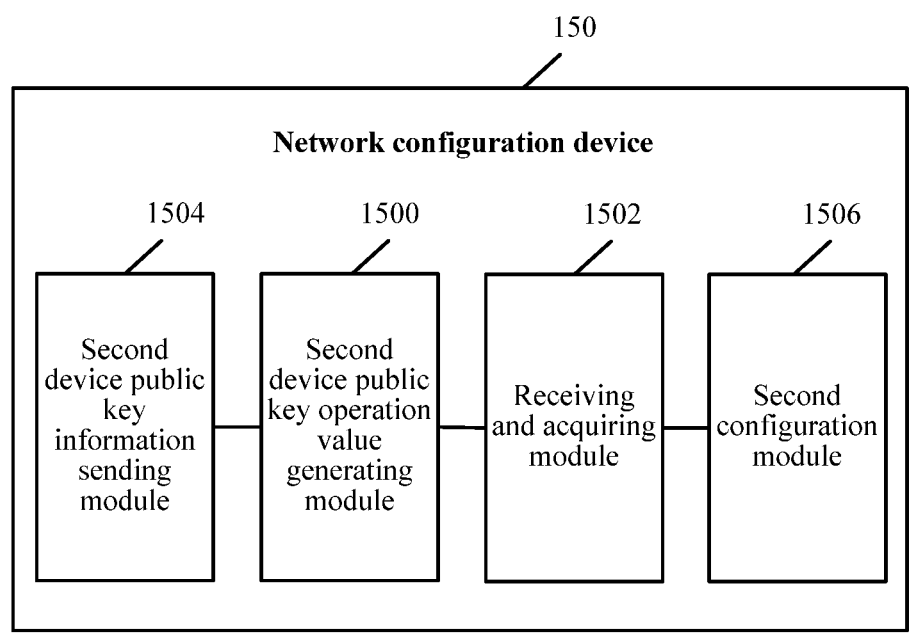
FIG. 15 is a schematic structural diagram of a first embodiment of a network configuration device according to the present disclosure.

For better implementation of the foregoing solutions of the embodiments of the present disclosure, the present disclosure further provides a related apparatus configured to cooperatively implement the foregoing solutions. Detailed descriptions are provided in the following with reference to FIG. 15 that shows a schematic structural diagram of a first embodiment of a network configuration device according to the present disclosure.

A network configuration device 150 includes a second device public key operation value generating module 1500, a receiving and acquiring module 1502, a second device public key information sending module 1504, and a second configuration module 1506, where the second device public key operation value generating module 1500 is configured to perform an operation of a preset algorithm on a public key that is used by a second device to perform key exchange, to obtain a public key operation value of the second device such that a first device acquires the public key operation value of the second device in an out-of-band manner. The receiving and acquiring module 1502 is configured to receive public key information of the first device sent by the first device, and acquire a public key of the first device according to the public key information of the first device, where the public key information of the first device is information that is generated by the first device according to the public key used to perform key exchange. The second device public key information sending module 1504 is configured to send public key information of the second device to the first device such that the first device acquires, according to the public key information of the second device, a public key copy of the second device that is used by the second device to perform key exchange, and the second configuration module 1506 is configured to generate a second exchange key according to a private key that is used by the second device to perform key exchange and the acquired public key of the first device in order to process configuration information between the first device and the second device using the second exchange key.

Figure 16:
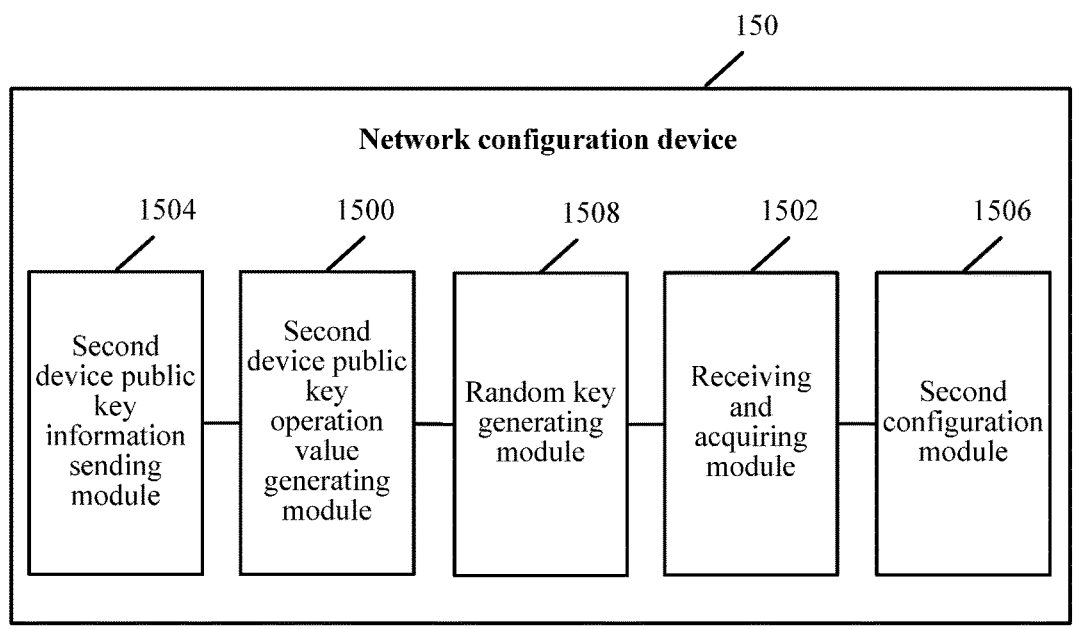
FIG. 16 is a schematic structural diagram of a second embodiment of a network configuration device according to the present disclosure.

Further, as shown in FIG. 16, which is a schematic structural diagram of a second embodiment of a network configuration device according to the present disclosure, in addition to the second device public key operation value generating module 1500, the receiving and acquiring module 1502, the second device public key information sending module 1504, and the second configuration module 1506, the network configuration device 150 may further include a random key generating module 1508 configured to generate key information of the second device such that the first device acquires the key information of the second device in the out-of-band manner.

Figure 17:
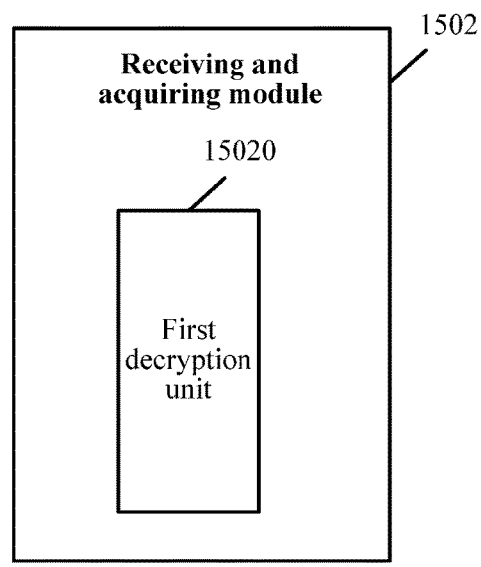
FIG. 17 is a schematic structural diagram of a first embodiment of a receiving and acquiring module according to the present disclosure.

Further, as shown in FIG. 17, which is a schematic structural diagram of a first embodiment of a receiving and acquiring module according to the present disclosure, the receiving and acquiring module 1502 may include a first decryption unit 15020, where the public key information of the first device received by the receiving and acquiring module 1502 is information obtained by performing, by the first device using the key information of the second device as a symmetric encryption key, a symmetric encryption operation on the public key that is used by the first device to perform key exchange, and the first decryption unit 15020 is configured to decrypt the public key information of the first device using the second device key information of the second device, to obtain the public key of the first device.

Figure 18:
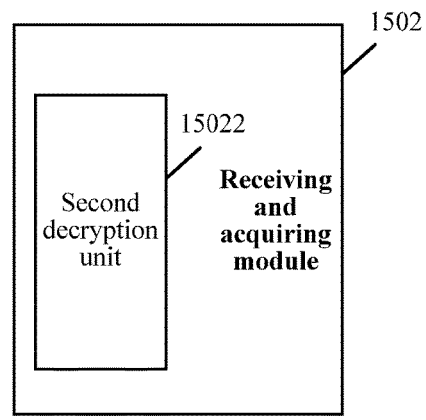
FIG. 18 is a schematic structural diagram of a second embodiment of a receiving and acquiring module according to the present disclosure.

Further, as shown in FIG. 18, which is a schematic structural diagram of a second embodiment of a receiving and acquiring module according to the present disclosure the receiving and acquiring module 1502 may include a second decryption unit 15022, where the public key information of the first device received by the receiving and acquiring module 1502 is information obtained by performing, by the first device using the public key operation value of the second device as a symmetric encryption key, a symmetric encryption operation on the public key that is used by the first device to perform key exchange, and the second decryption unit 15022 is configured to decrypt the public key information of the first device using the second device public key operation value of the second device, to obtain the public key of the first device.

Figure 19:
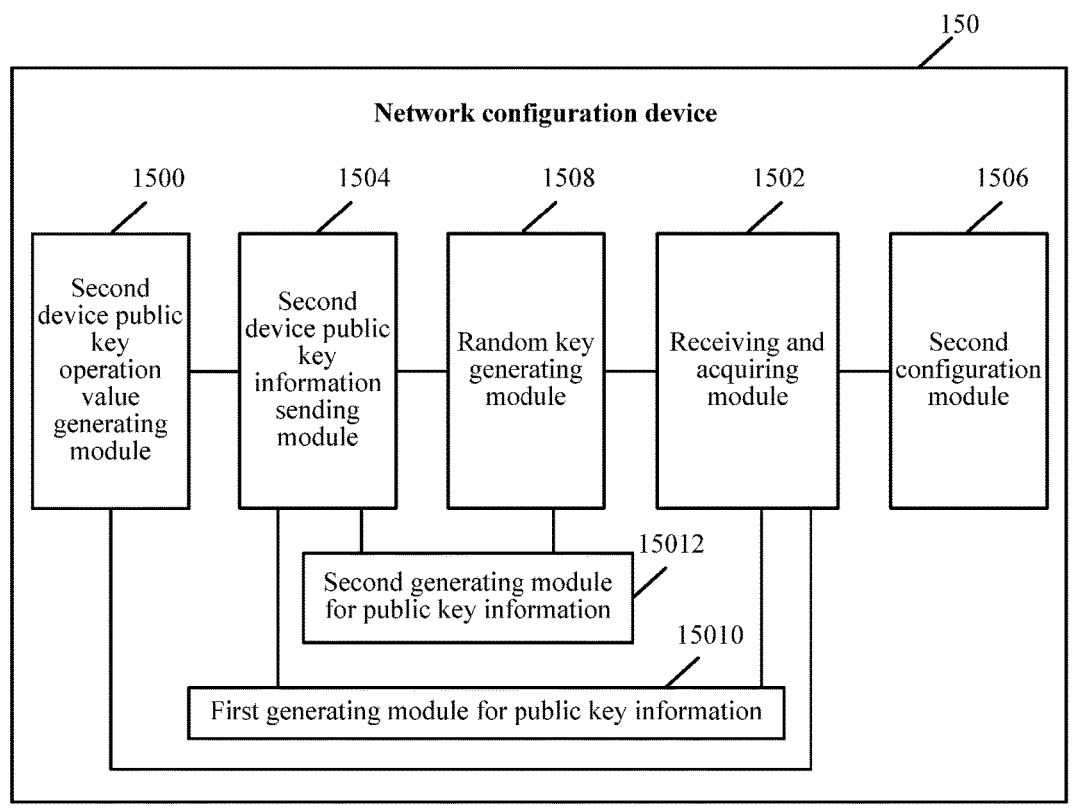
FIG. 19 is a schematic structural diagram of a third embodiment of a network configuration device according to the present disclosure.

Further, as shown in FIG. 19, which is a schematic structural diagram of a third embodiment of a network configuration device according to the present disclosure, in addition to the second device public key operation value generating module 1500, the receiving and acquiring module 1502, the second device public key information sending module 1504, the second configuration module 1506, and the random key generating module 1508, the network configuration device 150 may further include a first generating module for public key information 15010 and a second generating module for public key information 15012, where the first generating module for public key information 15010 is configured to perform a symmetric encryption operation on the public key of the second device using a public key operation value of the first device as a symmetric encryption key, to obtain the public key information of the second device, where the public key operation value of the first device is a result obtained by performing, by the second device, an operation of the preset algorithm on the obtained public key of the first device, or the second generating module for public key information 15012 is configured to perform symmetric encryption on the public key of the second device using the key information of the second device, to obtain the public key information of the second device when the first device acquires the key information of the second device in the out-of-band manner.

Figure 20:
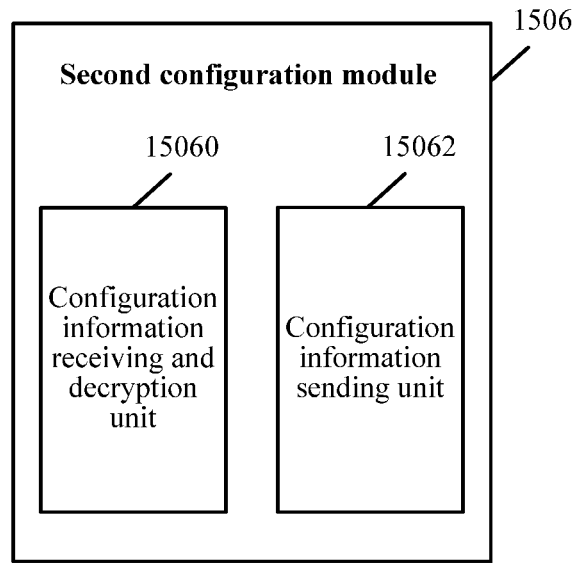
FIG. 20 is a schematic structural diagram of a first embodiment of a second configuration module according to the present disclosure.

Further, as shown in FIG. 20, which is a schematic structural diagram of a first embodiment of a second configuration module according to the present disclosure, the second configuration module 1506 includes a configuration information receiving and decryption unit 15060 and/or a configuration information sending unit 15062, where the configuration information receiving and decryption unit 15060 is configured to receive configuration information sent by the first device, where the configuration information is configuration information that is encrypted by the first device using a first exchange key as an encryption key, and the first exchange key is a result obtained by performing, by the first device, an operation on the public key copy of the second device and a private key of the first device, perform an operation on the private key that is used by the second device to perform key exchange and the acquired public key of the first device, to obtain the second exchange key, and decrypt the received configuration information using the second exchange key, and/or the configuration information sending unit 15062 is configured to perform an operation on the public key of the first device and the private key that is used by the second device to perform key exchange, to obtain the second exchange key, and encrypt the configuration information using the second exchange key as an encryption key, and send encrypted configuration information to the first device.

Figure 21:
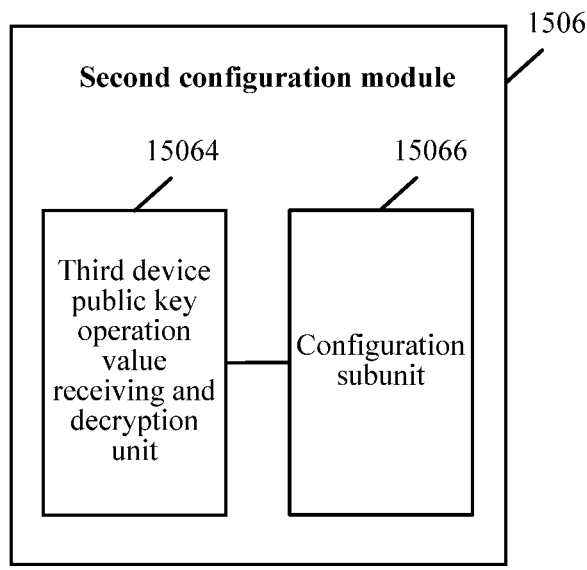
FIG. 21 is a schematic structural diagram of a second embodiment of a second configuration module according to the present disclosure.

Further, as shown in FIG. 21, which is a schematic structural diagram of a second embodiment of a second configuration module according to the present disclosure, the second configuration module 1506 includes a third device public key operation value receiving and decryption unit 15064 and a configuration subunit 15066, where the third device public key operation value receiving and decryption unit 15064 is configured to receive an encrypted public key operation value of a third device that is sent by the first device, perform an operation on the private key that is used by the second device to perform key exchange and the acquired public key of the first device, to obtain the second exchange key, and decrypt the encrypted public key operation value of the third device using the second exchange key, to obtain a public key operation value of the third device, where the encrypted public key operation value of the third device is a result obtained by encrypting, by the first device, the public key operation value of the third device using a first exchange key as an encryption key, the first exchange key is a result obtained by performing, by the first device, an operation on the public key copy of the second device and a private key of the first device, and the public key operation value of the third device is a result obtained by performing an operation of the preset algorithm on a public key that is used by the third device to perform key exchange, and the configuration subunit 15066 is configured to perform key exchange with the third device using the public key operation value of the third device, and complete a final configuration process.

Still further, the network configuration device 150 of this embodiment of the present disclosure may further include a hash operation verification module (not shown) configured to receive information which is sent by the first device and on which a hash-based message authentication code operation has been performed, and perform, using the second exchange key or a derivative key of the second exchange key as a decryption key of the hash-based message authentication code operation, decryption verification on the received information on which the hash-based message authentication code operation has been performed.

It should be noted that, functions of the functional modules in the network configuration device 150 in this embodiment of the present disclosure may be implemented according to the methods in the foregoing method embodiments, that is, refer to the foregoing method embodiments related to the second device in FIG. 1, FIG. 2, FIG. 3, FIG. 4, and FIG. 5, and details are not described herein again.

For better implementation of the foregoing solutions of the embodiments of the present disclosure, the present disclosure further provides a related device configured to cooperatively implement the foregoing solutions. Detailed descriptions are provided in the following with reference to FIG. 22 that shows a schematic structural diagram of a first embodiment of a network device according to the present disclosure.

Figure 22:
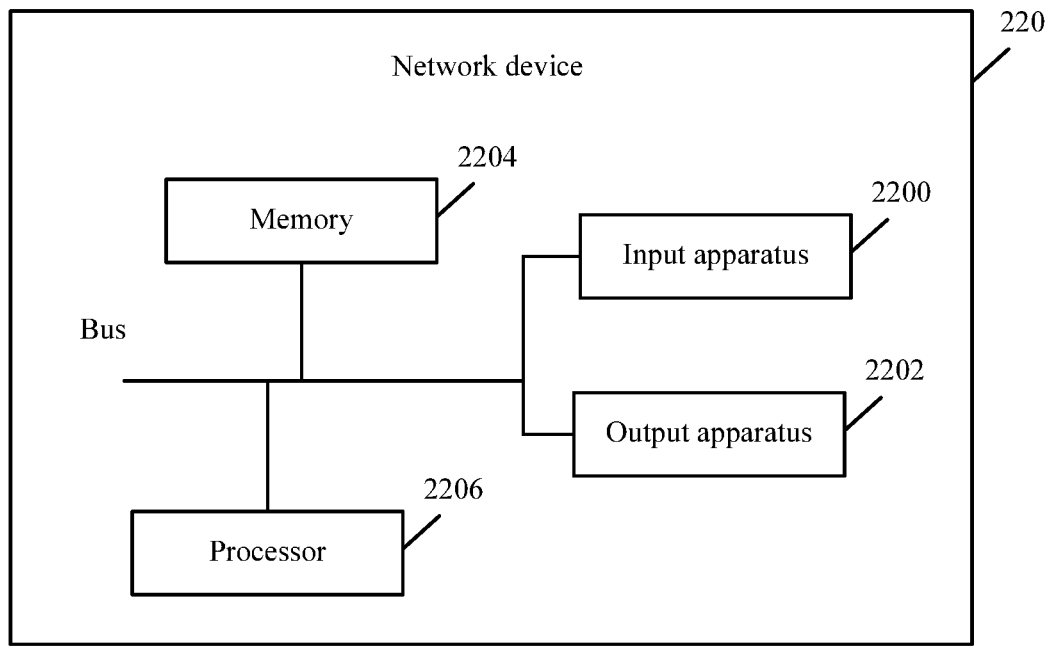
FIG. 22 is a schematic structural diagram of a first embodiment of a network device according to the present disclosure.

A network device 220 includes an input apparatus 2200, an output apparatus 2202, a memory 2204, and a processor 2206 (where the network device may include one or more processors 2206, and in FIG. 22, one processor is used as an example). In some embodiments of the present disclosure, the input apparatus 2200, the output apparatus 2202, the memory 2204, and the processor 2206 may be connected using a bus or in another manner, where connection by means of a bus is used as an example in FIG. 22.

The memory 2204 is configured to store program code, and the processor 2206 is configured to invoke the program code stored by the memory 2204, to perform the following steps: acquiring a public key operation value of a second device in an out-of-band manner using the input apparatus 2200, where the public key operation value of the second device is a result obtained by performing an operation of a preset algorithm on a public key that is used by the second device to perform key exchange, generating public key information of a first device according to a public key that is used by the first device to perform key exchange, and sending the public key information of the first device to the second device using the output apparatus 2202 such that the second device acquires the public key of the first device according to the public key information of the first device, acquiring, using the input apparatus 2200, a public key copy of the second device that is sent by the second device and that is used to perform key exchange, performing an operation of the preset algorithm on the public key copy of the second device, to obtain a public key operation value copy of the second device, and generating a first exchange key according to a private key that is used by the first device to perform key exchange and the acquired public key copy of the second device in order to process configuration information between the first device and the second device using the first exchange key after the public key operation value copy of the second device matches the public key operation value of the second device.

Furthermore, before generating public key information of a first device according to a public key that is used by the first device to perform key exchange, the processor 2206 further performs acquiring key information of the second device in the out-of-band manner using the input apparatus 2200.

Furthermore, generating, by the processor 2206, public key information of a first device according to a public key that is used by the first device to perform key exchange includes performing, using the key information of the second device as a symmetric encryption key, a symmetric encryption operation on the public key that is used by the first device to perform key exchange, to generate the public key information of the first device.

Furthermore, generating, by the processor 2206, public key information of a first device according to a public key that is used by the first device to perform key exchange includes performing, using the public key operation value of the second device as a symmetric encryption key, a symmetric encryption operation on the public key that is used by the first device to perform key exchange, to generate the public key information of the first device.

Furthermore, acquiring, by the processor 2206 using the input apparatus 2200, a public key copy of the second device that is sent by the second device and that is used to perform key exchange includes receiving, using the input apparatus 2200, public key information of the second device sent by the second device, where the public key information of the second device is information obtained by performing, by the second device, a symmetric encryption operation on the public key of the second device using a public key operation value of the first device as a symmetric encryption key, decrypting the public key information of the second device using a first device public key operation value copy of the first device, to obtain the public key copy of the second device, where the public key operation value of the first device is a result obtained by performing, by the second device, an operation of the preset algorithm on the obtained public key of the first device, and the public key operation value copy of the first device is a result obtained by performing an operation of the preset algorithm on the public key of the first device, or receiving, using the input apparatus 2200, public key information of the second device sent by the second device, where when the first device acquires the key information of the second device in the out-of-band manner, the public key information of the second device is information obtained by performing, by the second device, a symmetric encryption operation on the public key of the second device using the key information of the second device as a symmetric encryption key, and decrypting the public key information of the second device using the key information of the second device acquired by the first device, to obtain the public key copy of the second device.

Furthermore, generating, by the processor 2206, a first exchange key according to a private key that is used by the first device to perform key exchange and the acquired public key copy of the second device in order to process configuration information between the first device and the second device using the first exchange key includes performing an operation on the public key copy of the second device and the private key that is used by the first device to perform key exchange, to obtain the first exchange key, and encrypting the configuration information using the first exchange key as an encryption key, and sending encrypted configuration information to the second device.

Furthermore, generating, by the processor 2206, a first exchange key according to a private key that is used by the first device to perform key exchange and the acquired public key copy of the second device in order to process configuration information between the first device and the second device using the first exchange key includes receiving, using the input apparatus 2200, configuration information sent by the second device, where the configuration information sent by the second device is configuration information that is encrypted using a second exchange key as an encryption key, and the second exchange key is a result obtained by performing, by the second device, an operation on the obtained public key of the first device and a private key of the second device, performing an operation on the public key copy of the second device and the private key that is used by the first device to perform key exchange, to obtain the first exchange key, and decrypting the received configuration information using the first exchange key.

Furthermore, generating, by the processor 2206, a first exchange key according to a private key that is used by the first device to perform key exchange and the acquired public key copy of the second device in order to process configuration information between the first device and the second device using the first exchange key includes performing an operation on the public key copy of the second device and the private key that is used by the first device to perform key exchange, to obtain the first exchange key, encrypting a public key operation value of a third device using the first exchange key as an encryption key, where the public key operation value of the third device is a result obtained by performing an operation of the preset algorithm on a public key that is used by the third device to perform key exchange, sending an encrypted public key operation value of the third device to the second device such that the second device can acquire the public key operation value of the third device securely, and performs key exchange with the third device using the public key operation value of the third device and completes a final configuration process.

Furthermore, generating, by the processor 2206, a first exchange key according to a private key that is used by the first device to perform key exchange and the acquired public key copy of the second device in order to process configuration information between the first device and the second device using the first exchange key includes performing an operation on the public key copy of the second device and the private key that is used by the first device to perform key exchange, to obtain the first exchange key, and generating, based on the first exchange key, a session key used to protect service data transmission between the first device and the second device.

Furthermore, generating, by the processor 2206, a first exchange key according to a private key that is used by the first device to perform key exchange and the acquired public key copy of the second device in order to process configuration information between the first device and the second device using the first exchange key includes performing an operation on the public key copy of the second device and the private key that is used by the first device to perform key exchange, to obtain the first exchange key, and generating, based on the first exchange key, a master key used during a four-step handshake process.

Furthermore, after decrypting the received configuration information using the first exchange key, the processor 2206 further performs a hash-based message authentication code operation on the encrypted configuration information using the first exchange key or a derivative key of the first exchange key as an input key of the hash-based message authentication code operation, and sending, to the second device using the output apparatus 2202, information on which the hash-based message authentication code operation has been performed.

The processor 2206 further performs generating configuration acknowledgment information, performing a hash-based message authentication code operation on the configuration acknowledgment information using the first exchange key or a derivative key of the first exchange key as an input key of the hash-based message authentication code operation, and sending, to the second device using the output apparatus 2202, information on which the hash-based message authentication code operation has been performed.

The processor 2206 further performs a hash-based message authentication code operation on the encrypted public key operation value of the third device using the first exchange key or a derivative key of the first exchange key as an input key of the hash-based message authentication code operation, and send, to the second device using the output apparatus 2202, information on which the hash-based message authentication code operation has been performed.

The network device 220 in this embodiment of the present disclosure may be, for example, a network management device, a router, a transport node, a smart mobile terminal, or another network device.

It can be understood that, functions of the functional modules in the network device 220 may be further implemented according to the methods in the foregoing method embodiments, that is, refer to the foregoing method embodiments related to the first device in FIG. 1, FIG. 2, FIG. 3, FIG. 4, and FIG. 5, and details are not described herein again.

For better implementation of the foregoing solutions of the embodiments of the present disclosure, the present disclosure further provides a related device configured to cooperatively implement the foregoing solutions. Detailed descriptions are provided in the following with reference to FIG. 23 that shows a schematic structural diagram of a second embodiment of a network device according to the present disclosure.

Figure 23:
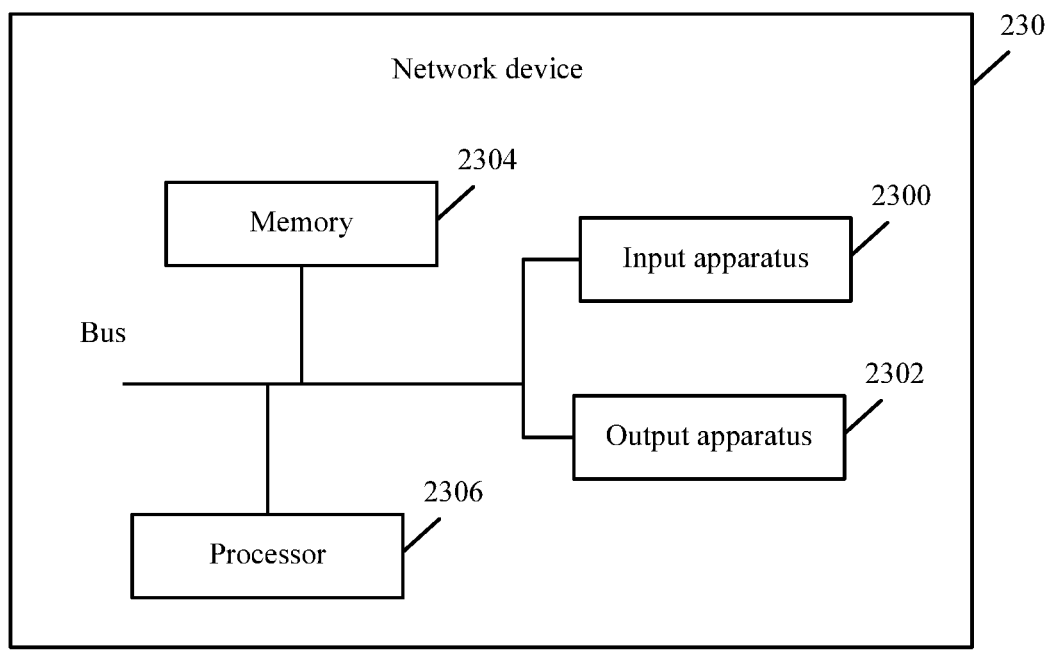
FIG. 23 is a schematic structural diagram of a second embodiment of a network device according to the present disclosure.

A network device 230 includes an input apparatus 2300, an output apparatus 2302, a memory 2304, and a processor 2306 (where the network device may include one or more processors 2306, and in FIG. 23, one processor is used as an example). In some embodiments of the present disclosure, the input apparatus 2300, the output apparatus 2302, the memory 2304, and the processor 2306 may be connected using a bus or in another manner, where connection by means of a bus is used as an example in FIG. 23.

The memory 2304 is configured to store program code, and the processor 2306 is configured to invoke the program code stored by the memory 2304, to perform the following steps: performing an operation of a preset algorithm on a public key that is used by a second device to perform key exchange, to obtain a public key operation value of the second device such that a first device acquires the public key operation value of the second device in an out-of-band manner, receiving, using the input apparatus 2300, public key information of the first device sent by the first device, and acquiring a public key of the first device according to the public key information of the first device, where the public key information of the first device is information that is generated by the first device according to the public key used to perform key exchange, sending public key information of the second device to the first device using the output apparatus 2302 such that the first device acquires, according to the public key information of the second device, a public key copy of the second device that is used by the second device to perform key exchange, and generating a second exchange key according to a private key that is used by the second device to perform key exchange and the acquired public key of the first device in order to process configuration information between the first device and the second device using the second exchange key.

Furthermore, before receiving, using the input apparatus 2300, public key information of the first device sent by the first device, the processor 2306 further performs generating key information of the second device such that the first device acquires the key information of the second device in the out-of-band manner.

Furthermore, the public key information of the first device received by the processor 2306 using the input apparatus 2300 is information obtained by performing, by the first device using the key information of the second device as a symmetric encryption key, a symmetric encryption operation on the public key that is used by the first device to perform key exchange, and acquiring, by the processor 2306, a public key of the first device according to the public key information of the first device includes decrypting the public key information of the first device using the second device key information of the second device, to obtain the public key of the first device.

Furthermore, the public key information of the first device received by the processor 2306 using the input apparatus 2300 is information obtained by performing, by the first device using the key information of the second device as a symmetric encryption key, a symmetric encryption operation on the public key that is used by the first device to perform key exchange, and acquiring, by the processor 2306, a public key of the first device according to the public key information of the first device includes decrypting the public key information of the first device using the second device key information of the second device, to obtain the public key of the first device.

Furthermore, the public key information of the second device is information obtained by performing, by the processor 2306, symmetric encryption on the public key of the second device using a public key operation value of the first device, and the public key operation value of the first device is a result obtained by performing, by the processor 2306, an operation of the preset algorithm on the acquired public key of the first device, or the public key information of the second device is information obtained by performing, by the processor 2306, symmetric encryption on the public key of the second device using the key information of the second device when the first device acquires the key information of the second device in the out-of-band manner.

Furthermore, generating, by the processor 2306, a second exchange key according to a private key that is used by the second device to perform key exchange and the acquired public key of the first device in order to process configuration information between the first device and the second device using the second exchange key includes receiving, using the input apparatus 2300, configuration information sent by the first device, where the configuration information is configuration information that is encrypted by the first device using a first exchange key as an encryption key, and the first exchange key is a result obtained by performing, by the first device, an operation on the public key copy of the second device and a private key of the first device, performing an operation on the private key that is used by the second device to perform key exchange and the acquired public key of the first device, to obtain the second exchange key, and decrypting the received configuration information using the second exchange key, or performing an operation on the private key that is used by the second device to perform key exchange and the acquired public key of the first device, to obtain the second exchange key, and encrypting the configuration information using the second exchange key as an encryption key, and sending encrypted configuration information to the first device using the output apparatus 2302.

Furthermore, generating, by the processor 2306, a second exchange key according to a private key that is used by the second device to perform key exchange and the acquired public key of the first device in order to process configuration information between the first device and the second device using the second exchange key includes receiving, using the input apparatus 2300, an encrypted public key operation value of a third device that is sent by the first device, performing an operation on the private key that is used by the second device to perform key exchange and the acquired public key of the first device, to obtain the second exchange key, decrypting the encrypted public key operation value of the third device using the second exchange key, to obtain a public key operation value of the third device, performing key exchange with the third device using the public key operation value of the third device, and completing a final configuration process, where the encrypted public key operation value of the third device is a result obtained by encrypting, by the first device, the public key operation value of the third device using the first exchange key as an encryption key. The first exchange key is a result obtained by performing, by the first device, an operation on the public key copy of the second device and a private key of the first device, and the public key operation value of the third device is a result obtained by performing an operation of the preset algorithm on a public key that is used by the third device to perform key exchange.

The processor 2306 further performs receiving, using the input apparatus 2300, information which is sent by the first device and on which a hash-based message authentication code operation has been performed, and performing, using the second exchange key or a derivative key of the second exchange key as a decryption key of the hash-based message authentication code operation, decryption verification on the information which is received using the input apparatus 2300 and on which the hash-based message authentication code operation has been performed.

The network device 230 in this embodiment of the present disclosure may be, for example, a network management device, a router, a transport node, a smart mobile terminal, or another network device.

It can be understood that, functions of the functional modules in the network device 230 may be further implemented according to the methods in the foregoing method embodiments, that is, refer to the foregoing method embodiments related to the second device in FIG. 1, FIG. 2, FIG. 3, FIG. 4, and FIG. 5, and details are not described herein again.

Figure 24:
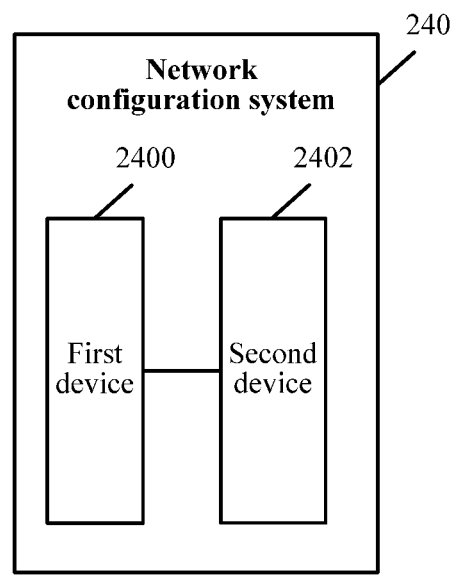
FIG. 24 is a schematic structural diagram of a network configuration system according to an embodiment of the present disclosure.

For better implementation of the foregoing solutions of the embodiments of the present disclosure, the present disclosure further provides a related system configured to cooperatively implement the foregoing solutions. Detailed descriptions are provided in the following with reference to FIG. 24 that shows a schematic structural diagram of a network configuration system according to an embodiment of the present disclosure.

A network configuration system 240 includes a first device 2400 and a second device 2402, where for the first device 2400, refer to the network device 220 in the foregoing embodiment of FIG. 22, and details are not described herein again. For the second device 2402, refer to the network device 230 in the foregoing embodiment of FIG. 23, and details are not described herein again.

It should be noted that, in some configuration scenarios, when the two devices are both UI restricted devices, one device cannot securely obtain a public key operation value of the other device. In this case, a third-party device needs to be used to assist in configuration and connection of the two to-be-configured devices. That is, the network configuration system 240 may further include a third device, where the first device 2400 is a third-party device, and both the second device 2402 and the third device may be UI restricted devices, and the first device 2400 needs to be used to assist in configuration and connection. For a detailed configuration and connection manner, refer to implementation manners in the foregoing method embodiments, and details are not described herein again.

In conclusion, by means of implementation of the embodiments of the present disclosure, an operation is performed on a public key to obtain a public key operation value, and the public key for key exchange is encrypted using the public key operation value as an encryption key, which can significantly improve the security of a configuration process. In interaction information of the configuration process, the public key is replaced with the public key operation value, which can reduce content of the interaction information, and improve the utilization of out-of-band channels of both devices. Moreover, configuration can be completed in a configuration manner of scanning multi-dimensional codes, which resolves problems in the prior art that a PIN manner is relatively complex and not secure, a PBC manner is not sufficiently secure, and NFC has relatively low universality. Besides, as compared with performing multi-dimensional code encoding on a public key, content in multi-dimensional code encoding is significantly reduced, which lowers requirements on display, scanning, and decoding of multi-dimensional codes, achieves high universality, greatly improves configuration efficiency, and significantly improves configuration experience of users.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a read-only memory (ROM), or a random access memory (RAM).

What is disclosed above is merely exemplary embodiments of the present disclosure, and certainly is not intended to limit the protection scope of the present disclosure. A person of ordinary skill in the art may understand that all or some of processes that implement the foregoing embodiments and equivalent modifications made in accordance with the claims of the present disclosure shall fall within the scope of the present disclosure.

What is claimed is:

1. A network configuration method, comprising:
acquiring, by a first device, a public key operation value and key information of a second device in an out-of-band manner, wherein the public key operation value of a second device is a result obtained by performing an operation of a preset algorithm on a public key that is used by the second device to perform key exchange;
performing, by the first device using the key information of the second device or the public key operation value of the second device as a symmetric encryption key, a symmetric encryption operation on a second public key that is used by the first device to perform the key exchange in order to generate public key information of the first device;
sending, by the first device, the public key information of the first device to the second device such that the second device acquires the public key of the first device according to the public key information of the first device;
acquiring, by the first device, a public key copy of the second device from the second device and that is used to perform the key exchange;
performing, by the first device, the operation of the preset algorithm on the public key copy of the second device, to obtain a public key operation value copy of the second device; and
generating, by the first device, a first exchange key according to a private key that is used by the first device to perform the key exchange and the public key copy of the second device in order to process configuration information between the first device and the second device using the first exchange key after the public key operation value copy of the second device matches the public key operation value of the second device.

2. The method according to claim 1, wherein acquiring the public key copy of the second device from the second device and that is used to perform the key exchange comprises:
receiving, by the first device, public key information of the second device from the second device, wherein the public key information of the second device is information obtained by performing, by the second device, the symmetric encryption operation on the public key of the second device using a public key operation value of the first device as the symmetric encryption key;
decrypting, by the first device, the public key information of the second device using a public key operation value copy of the first device, to obtain the public key copy of the second device, wherein the public key operation value of the first device is another result obtained by performing, by the second device, the operation of the preset algorithm on the obtained public key of the first device, and wherein the public key operation value copy of the first device is another result obtained by performing the operation of the preset algorithm on the public key of the first device;

receiving, by the first device, the public key information of the second device from the second device, wherein when the first device acquires the key information of the second device in the out-of-band manner, the public key information of the second device is the information obtained by performing, by the second device, the symmetric encryption operation on the public key of the second device using the key information of the second device as the symmetric encryption key; and decrypting, by the first device, the public key information of the second device using the key information of the second device acquired by the first device, to obtain the public key copy of the second device.

3. The method according to claim 1, wherein generating the first exchange key according to the private key that is used by the first device to perform the key exchange and the public key copy of the second device in order to process the configuration information between the first device and the second device using the first exchange key comprises:

performing another operation on the public key copy of the second device and the private key that is used by the first device to perform the key exchange, to obtain the first exchange key;

encrypting the configuration information using the first exchange key as an encryption key; and sending the encrypted configuration information to the second device.

4. The method according to claim 1, wherein generating the first exchange key according to the private key that is used by the first device to perform the key exchange and the public key copy of the second device in order to process the configuration information between the first device and the second device using the first exchange key comprises:

receiving configuration information from the second device, wherein the configuration information from the second device is the configuration information that is encrypted using a second exchange key as an encryption key, and wherein the second exchange key is another result obtained by performing, by the second device, another operation on the obtained public key of the first device and a private key of the second device;

performing another operation on the public key copy of the second device and the private key that is used by the first device to perform the key exchange, to obtain the first exchange key; and decrypting the received configuration information using the first exchange key.

5. The method according to claim 1, wherein generating the first exchange key according to the private key that is used by the first device to perform the key exchange and the public key copy of the second device in order to process the configuration information between the first device and the second device using the first exchange key comprises:

performing, by the first device, operation on the public key copy of the second device and the private key that is used by the first device to perform the key exchange, to obtain the first exchange key;

encrypting, by the first device, a public key operation value of a third device using the first exchange key as an encryption key, wherein the public key operation value of the third device is another result obtained by performing the operation of the preset algorithm on a third public key that is used by the third device to perform the key exchange; and sending, by the first device, the encrypted public key operation value of the third device to the second device such that the second device acquires the public key operation value of the third device securely, and perform the key exchange with the third device using the public key operation value of the third device and completes a final configuration process.

6. The method according to claim 1, wherein generating the first exchange key according to the private key that is used by the first device to perform the key exchange and the public key copy of the second device in order to process the configuration information between the first device and the second device using the first exchange key comprises:

performing another operation on the public key copy of the second device and the private key that is used by the first device to perform the key exchange, to obtain the first exchange key; and generating, based on the first exchange key, a session key used to protect service data transmission between the first device and the second device.

7. The method according to claim 1, wherein generating the first exchange key according to the private key that is used by the first device to perform the key exchange and the public key copy of the second device in order to process the configuration information between the first device and the second device using the first exchange key comprises:

performing another operation on the public key copy of the second device and the private key that is used by the first device to perform the key exchange, to obtain the first exchange key; and generating, based on the first exchange key, a master key used during a four-step handshake process.

8. The method according to claim 3, further comprising:

performing a hash-based message authentication code operation on the encrypted configuration information using the first exchange key or a derivative key of the first exchange key as an input key of the hash-based message authentication code operation; and sending, to the second device, information on which the hash-based message authentication code operation has been performed.

9. The method according to claim 4, wherein after decrypting the received configuration information using the first exchange key, the method further comprises:

generating configuration acknowledgment information;

performing a hash-based message authentication code operation on the configuration acknowledgment information using the first exchange key or a derivative key of the first exchange key as an input key of the hash-based message authentication code operation; and sending, to the second device, information on which the hash-based message authentication code operation has been performed.

10. The method according to claim 5, further comprising:

performing a hash-based message authentication code operation on the encrypted public key operation value of the third device using the first exchange key or a derivative key of the first exchange key as an input key of the hash-based message authentication code operation; and sending, to the second device, information on which the hash-based message authentication code operation has been performed.

11. A network configuration method, comprising:

performing, by a second device, an operation of a preset algorithm on a public key that is used by the second device to perform key exchange, to obtain a public key operation value of the second device such that a first device acquires the public key operation value of the second device in an out-of-band manner;

receiving, by the second device, public key information of the first device from the first device, wherein the first device obtains the public key information of the first device by performing, using the public key information of the second device as a symmetric encryption key, a symmetric encryption operation on the public key that is used by the first device to perform the key exchange;

acquiring, by the second device, a public key of the first device according to the public key information of the first device by decrypting the public key information of the first device using the public key information of the second device, wherein the public key information of the first device is information that is generated by the first device according to the public key used to perform the key exchange;

sending, by the second device, public key information of the second device to the first device such that the first device acquires, according to the public key information of the second device, a public key copy of the second device that is used by the second device to perform the key exchange; and generating, by the second device, a second exchange key according to a private key that is used by the second device to perform the key exchange and the acquired public key of the first device in order to process configuration information between the first device and the second device using the second exchange key.

12. The method according to claim 11, wherein the public key information of the second device is the information obtained by performing, by the second device, the symmetric encryption operation on the public key of the second device using a public key operation value of the first device as the symmetric encryption key, wherein the public key operation value of the first device is a result obtained by performing, by the second device, the operation of the preset algorithm on the acquired public key of the first device, and wherein the public key information of the second device is the information obtained by performing, by the second device, the symmetric encryption operation on the public key of the second device using the public key information of the second device as the symmetric encryption key when the first device acquire the public key information of the second device in the out-of-band manner.

13. The method according to claim 11, wherein generating the second exchange key according to the private key that is used by the second device to perform the key exchange and the acquired public key of the first device in order to process the configuration information between the first device and the second device using the second exchange key comprises:

receiving configuration information from the first device, wherein the configuration information is the configuration information that is encrypted by the first device using a first exchange key as an encryption key, and wherein the first exchange key is a result obtained by performing, by the first device, another operation on the public key copy of the second device and a private key of the first device;

performing another operation on the private key that is used by the second device to perform the key exchange and the acquired public key of the first device, to obtain the second exchange key, and decrypting the received configuration information using the second exchange key; or performing the other operation on the private key that is used by the second device to perform the key exchange and the acquired public key of the first device, to obtain the second exchange key, encrypting the configuration information using the second exchange key as the encryption key, and sending the encrypted configuration information to the first device.

14. The method according to claim 11, wherein generating the second exchange key according to the private key that is used by the second device to perform the key exchange and the acquired public key of the first device in order to process the configuration information between the first device and the second device using the second exchange key comprises:

receiving an encrypted public key operation value of a third device from the first device;

performing another operation on the private key that is used by the second device to perform the key exchange and the acquired public key of the first device, to obtain the second exchange key;

decrypting the encrypted public key operation value of the third device using the second exchange key, to obtain a public key operation value of the third device;

performing the key exchange with the third device using the public key operation value of the third device; and completing a final configuration process, wherein the encrypted public key operation value of the third device is a result obtained by encrypting, by the first device, the public key operation value of the third device using a first exchange key as an encryption key, wherein the first exchange key is another result obtained by performing, by the first device, another operation on the private key of the first device and the public key copy of the second device, and wherein the public key operation value of the third device is another result obtained by performing the operation of the preset algorithm on a second public key that is used by the third device to perform the key exchange.

15. A network device, comprising:

an input apparatus;

an output apparatus;

a memory configured to store a program code; and a processor coupled to the input apparatus, the output apparatus and the memory, wherein the processor is configured to invoke the program code stored by the memory, to perform the following operations:

acquire a public key operation value and key information of a second device in an out-of-band manner using the input apparatus, wherein the public key operation value of the second device is a result obtained by performing an operation of a preset algorithm on a public key that is used by the second device to perform key exchange;

perform, using the key information of the second device or the public key operation value of the second device as a symmetric encryption key, a symmetric encryption operation on the public key that is used by a first device to perform the key exchange in order to generate public key information of the first device:

send the public key information of the first device to the second device using the output apparatus such that the second device acquires the public key of the first device according to the public key information of the first device;

acquire, using the input apparatus, a public key copy of the second device from the second device and that is used to perform the key exchange;

perform the operation of the preset algorithm on the public key copy of the second device, to obtain a public key operation value copy of the second device; and generate a first exchange key according to a private key that is used by the first device to perform the key exchange and the public key copy of the second device in order to process configuration information between the first device and the second device using the first exchange key after the public key operation value copy of the second device matches the public key operation value of the second device.

\* \* \* \* \*

UNITED STATES PATENT AND TRADEMARK OFFICE
CERTIFICATE OF CORRECTION

PATENT NO. : 10,097,524 B2
APPLICATION NO. : 15/106871
DATED : October 9, 2018
INVENTOR(S) : Xiaoxian Li et al.

Page 1 of 1

It is certified that error appears in the above-identified patent and that said Letters Patent is hereby corrected as shown below:

Column 45, Line 56: insert --another-- before "operation"

Signed and Sealed this
Thirteenth Day of November, 2018

Andrei Iancu
*Director of the United States Patent and Trademark Office*